US012758866B2

(12) United States Patent
Weng et al.

(10) Patent No.: US 12,758,866 B2
(45) Date of Patent: Oct. 13, 2026

(54) POSITIONING METHOD AND LOCATOR OF COMBINED CONTROLLER, CONTROLLER HANDLE AND VIRTUAL SYSTEM

(71) Applicant: PIMAX TECHNOLOGY (SHANGHAI) CO., LTD, Shanghai (CN)

(72) Inventors: Zhibin Weng, Shanghai (CN); Ke Zhou, Shanghai (CN); Lei Chen, Shanghai (CN)

(73) Assignee: PIMAX TECHNOLOGY (SHANGHAI) CO., LTD, Shanghai (CN)

( * ) Notice: Subject to any disclaimer, the term of this patent is extended or adjusted under 35 U.S.C. 154(b) by 385 days.

(21) Appl. No.: 18/361,235

(22) Filed: Jul. 28, 2023

(65) Prior Publication Data

US 2024/0033614 A1 Feb. 1, 2024

(30) Foreign Application Priority Data

Jul. 29, 2022 (CN) ........................ 202210912287.X

(51) Int. Cl.
*A63F 13/22* (2014.01)
*A63F 13/211* (2014.01)
(Continued)

(52) U.S. Cl.
CPC ............ *A63F 13/22* (2014.09); *A63F 13/211* (2014.09); *A63F 13/213* (2014.09); *A63F 13/24* (2014.09);
(Continued)

(58) Field of Classification Search
CPC ...... A63F 13/22; A63F 13/211; A63F 13/213; A63F 13/24; A63F 2300/1018; A63F 2300/8082; G06F 3/0386; G06F 3/0346
See application file for complete search history.

(56) References Cited

U.S. PATENT DOCUMENTS 10,365,710 B2 * 7/2019 Yang .................... G02B 27/017
10,409,392 B1 9/2019 Allin et al.
(Continued)

FOREIGN PATENT DOCUMENTS

CN 112437213 A 3/2021
CN 112822480 A 5/2021
(Continued)

OTHER PUBLICATIONS

First Office Action issued in counterpart Chinese Patent Application No. 202210912287.X, dated Mar. 25, 2025.
(Continued)

*Primary Examiner* — Peter J Iannuzzi
(74) *Attorney, Agent, or Firm* — Westbridge IP LLC

(57) ABSTRACT

Disclosed are a positioning method and a locator of a combined controller, a combined controller and a virtual system. The positioning method of a combined controller includes: acquiring initial positioning information of the control handle and initial positioning information of the handle housing after the control handle is in communication connection with a head-mounted display device; acquiring a calibrated positioning of the control handle and a calibrated positioning of the handle housing; and calibrating the initial positioning information of the control handle and the initial positioning information of the handle housing according to the calibrated positioning of the control handle and the calibrated positioning of the handle housing to obtain spatial positioning information of the combined controller.

13 Claims, 16 Drawing Sheets

32

(51) Int. Cl.
*A63F 13/213* (2014.01)
*A63F 13/24* (2014.01)

(52) U.S. Cl.
CPC ................. *A63F 2300/1018* (2013.01); *A63F 2300/8082* (2013.01)

(56) References Cited

U.S. PATENT DOCUMENTS

| | | | | |
|---|---|---|---|---|
| 10,488,223 | B1 * | 11/2019 | Yee | G01C 25/005 |
| 10,705,597 | B1 | 7/2020 | Morin et al. | |
| 12,309,505 | B2 * | 5/2025 | Shah | H04N 17/004 |
| 2019/0171302 | A1 | 6/2019 | Su et al. | |
| 2021/0197079 | A1 | 7/2021 | Seibert et al. | |

FOREIGN PATENT DOCUMENTS

| | | | |
|---|---|---|---|
| CN | 213853055 | U | 8/2021 |
| CN | 113721767 | A | 11/2021 |
| CN | 114146404 | A | 3/2022 |
| JP | 2020091774 | A | 6/2020 |
| WO | 2020000177 | A1 | 1/2020 |

OTHER PUBLICATIONS

Notice of Reasons for Refusal issued in counterpart Japanese Patent Application No. 2023-019193, dated Jan. 30, 2024.

* cited by examiner

POSITIONING METHOD AND LOCATOR OF COMBINED CONTROLLER, CONTROLLER HANDLE AND VIRTUAL SYSTEM

CROSS-REFERENCE TO RELATED APPLICATIONS

The present application claims priority to Chinese Patent Application No. 202210912287.X, filed on Jul. 29, 2022, the entire contents of which are incorporated herein by reference for all purposes.

TECHNICAL FIELD

The present application relates to the field of virtual reality, in particular to a positioning method and a locator of a combined controller, a combined controller and a virtual system.

BACKGROUND

VR (virtual reality) device includes a head-mounted display and a control handle. When experiencing a VR head-mounted display device, the user wears the head-mounted display the head and holds the control handle in the hand. In the prior art, the control handle is usually designed corresponding to the head-mounted display. Therefore, in general, the control handle suitable for the head-mounted display can only be applied to the VR head-mounted display device, but not suitable for the handheld game console with similar game features. Since the control handle of the handheld game console has many similarities with the control handle of the VR head-mounted display device, if the user purchases the control handle of the VR head-display device and the control handle of the handheld game console separately, it will cause a waste of resources.

During use, the spatial position information of the control handle of the VR head-mounted display device is closely related to the VR experience, but the control handle of the handheld game console does not need spatial position information. Therefore, the control handle of the handheld game console and the control handle of the VR head-mounted display device cannot simply interact exchange or share. At present, there is an urgent need for a control handle that is universally applicable to the VR head-mounted display device and the handheld game console, so as to reduce waste of resources.

SUMMARY

In view of this, the present application provides a positioning method and locator of a combined controller, a combined controller and a virtual system, and solves the technical problem in the prior art that there is an urgent need for a control handle universally applicable to the VR head-mounted display device and the handheld game console, so as to reduce waste of resources.

According to one aspect of the present application, the present application provides a positioning method of a combined controller, the combined controller includes a control handle and a handle housing, wherein the positioning method of the combined controller includes: acquiring initial positioning information of the control handle and initial positioning information of the handle housing after the control handle being in communication connection with a head-mounted display device; acquiring a calibrated positioning of the control handle and a calibrated positioning of the handle housing; and calibrating the initial positioning information of the control handle and the initial positioning information of the handle housing according to the calibrated positioning of the control handle and the calibrated positioning of the handle housing to obtain spatial positioning information of the combined controller.

In an embodiment of the present application, the calibrating the initial positioning information of the control handle and the initial positioning information of the handle housing according to the calibrated positioning of the control handle and the calibrated positioning of the handle housing to obtain the spatial positioning information of the combined controller includes: calibrating the initial positioning information of the control handle according to the calibrated positioning of the control handle to obtain the positioning information of the control handle; calibrating the initial positioning information of the handle housing according to the calibrated positioning of the handle housing to obtain the positioning of the handle housing; and integrating the positioning of the control handle and the positioning of the handle housing to obtain spatial positioning of the combined controller.

In an embodiment of the present application, the handle housing includes an annular portion and a gripping portion, wherein a recessed portion is disposed at the center of the gripping portion to accommodate and fix the control handle; the combined controller further includes a first infrared sensor disposed on the control handle and a second infrared sensor disposed on the annular portion; and the acquiring initial positioning of the control handle and initial positioning of the handle housing after the control handle has been communicated with a head-mounted display device includes: acquiring positioning information of the head-mounted display device after the control handle being in communication with the head-mounted display device; acquiring a first light-spot image of the first infrared sensor and IMU data of the control handle, and computing the initial positioning information of the control handle according to the first light-spot image, the IMU data of the control handle and the positioning information of the head-mounted display device; and acquiring a second light-spot image of the second infrared sensor and IMU data of the handle housing, and computing the initial positioning information of the handle housing according to the second light-spot image, the IMU data of the handle housing and the positioning information of the head-mounted display device.

In an embodiment of the present application, the acquiring the positioning information of the head-mounted display device includes: acquiring a spatial image of the head-mounted display device; acquiring IMU data of the head-mounted display device; and computing the spatial image of the head-mounted display device and the IMU data of the head-mounted display device to obtain the positioning information of the head-mounted display device.

In an embodiment of the present application, before the acquiring initial positioning information of the control handle and initial positioning information of the handle housing after the control handle being in communication connection with the head-mounted display device, the positioning method of the combined controller further includes: before the combined controller leaves the factory, performing calibration of the control handle and the handle housing of the combined controller to obtain the calibrated positioning of the control handle and the calibrated positioning of the handle housing.

In one embodiment of the present application, the performing calibration of the control handle and the handle housing of the combined controller to obtain the calibrated positioning of the control handle and the calibrated positioning of the handle housing includes: acquiring a first test light-spot image of the first infrared sensor and test IMU data of the control handle, a second test light-spot image of the second infrared sensor and test IMU data of the handle housing; acquiring test positioning information of the control handle according to the first test light-spot image and the test IMU data of the control handle; acquiring the test positioning information of the handle housing according to the second test light-spot image and the test IMU data of the handle housing; comparing the test positioning information of the control handle with standard positioning information of the control handle to obtain the calibrated positioning of the control handle; and comparing the test positioning information of the handle housing with standard positioning information of the handle housing to obtain the calibrated positioning of the handle housing.

In an embodiment of the present application, the combined controller further includes a first memory disposed on the control handle and a second memory provided on the handle housing; after the performing pre-delivery calibration of test positioning information of the control handle and test positioning information of the handle housing of the combined controller to obtain the calibrated positioning of the control handle and the calibrated positioning of the handle housing, the positioning method of the combined controller further includes: storing the calibrated positioning of the control handle in the first memory and storing the calibrated positioning of the handle housing in the second memory respectively; and the acquiring a calibrated positioning of the control handle and a calibrated positioning of the handle housing includes: acquiring the calibrated positioning of the control handle from the first memory and acquiring the calibrated positioning of the handle housing from the second memory respectively.

In an embodiment of the present application, the calibrated positioning of the control handle includes a position offset of the control handle and a rotation offset of the control handle; and the calibrated positioning of the handle housing includes a position offset of the handle housing and a rotation offset of the handle housing.

As a second aspect of the present application, the present application provides a positioning controller for a combined controller, comprising: a unit determining connection status, configured to determine a connection status between a control handle and a head-mounted display device; an unit acquiring information, configured to: acquire initial positioning information of the control handle and initial positioning information of a handle housing, and acquire the calibrated positioning of the control handle and the calibrated positioning of the handle housing; and a spatial positioning unit, configured to calibrate the initial positioning information of the control handle and the initial positioning information of the handle housing according to the calibrated positioning of the control handle and the calibrated positioning of the handle housing to obtain spatial positioning information of the combined controller.

In an embodiment of the present application, the spatial positioning unit includes: a first calibration module, configured to calibrate the initial positioning information of the control handle according to the calibrated positioning of the control handle to obtain positioning information of the control handle; a second calibration module, configured to calibrate the initial positioning information of the handle housing according to the calibrated positioning of the handle housing to obtain positioning information of the handle housing; and a positioning module, configured to integrate the positioning information of the control handle and the positioning information of the handle housing to obtain spatial positioning information of the combined controller.

In an embodiment of the present application, the information determination unit includes: a module acquiring information of head-mounted display, configured to acquire positioning information of the head-mounted display device; a first module acquiring positioning information configured to: acquire a first light-spot image of a first infrared sensor and IMU data of the control handle, and compute the initial positioning information of the control handle according to the first light-spot image, the IMU data of the control handle and the positioning information of the head-mounted display device; and a second module acquiring positioning information, configured to:

acquire a second light-spot image of a second infrared sensor and IMU data of the handle housing, and compute the initial positioning information of the handle housing according to the second light-spot image, the IMU data of the handle housing and the positioning information of the head-mounted display device.

In an embodiment of the present application, the head-mounted display information determination module includes: an image acquisition module, configured to acquire a spatial image of the head-mounted display device; a degree-of-freedom data acquisition module, configured to acquire IMU data of the head-mounted display device; and a computation module, configured to compute the spatial image where the head-mounted display device is located and the IMU data of the head-mounted display device to obtain the positioning information of the head-mounted display device.

In an embodiment of the present application, the spatial positioning unit further includes: a calibration module, configured to perform calibration of the control handle and the handle housing of the combined controller before the combined controller leaves the factory, and obtain the calibrated positioning of the control handle and the calibrated positioning of the handle housing.

As a third aspect of the present application, the present application also provides a combined controller, comprising: control handle; a first infrared sensor disposed on the control handle; a handle housing, comprising an annular portion and a gripping portion, wherein a recessed portion is provided at the center of the gripping portion to accommodate and fix the control handle; and a second infrared sensor disposed on the annular portion.

In an embodiment of the present application, the combined controller further includes: a first inertial sensor disposed on the control handle, wherein the first inertial sensor is configured to measure IMU data of the control handle; and a second inertial sensor disposed on the handle housing, wherein the second inertial sensor is configured to measure IMU data of the handle housing.

In an embodiment of the present application, the combined controller further includes: a first memory disposed on the control handle, wherein the first memory is configured to store calibrated positioning of the control handle; and a second memory is disposed on the handle housing, wherein the second memory is configured to store calibrated positioning of the handle housing.

In an embodiment of the present application, the combined controller further includes: a main control chip disposed on the control handle, wherein the main control chip is communicated to both the first memory and the second memory; and the main control chip is configured to: retrieve the calibrated positioning of the control handle from the first memory and retrieve the calibrated positioning of the handle housing from the second memory respectively.

As the fourth aspect of the present application, the present application also provides a virtual system, and the virtual system includes: the combined controller described above; the positioning controller of the combined controller described above; a head-mounted display device; and an imaging apparatus disposed on the head-mounted display device, wherein the imaging apparatus is configured to capture a first light-spot image of the first infrared sensor, a second light-spot image of the second infrared sensor, and a spatial image of the head-mounted display device, wherein the positioning controller of the combined controller is disposed on the head-mounted display device, and the imaging apparatus and the control handle are both in communication connection with the positioning controller of the combined controller.

In an embodiment of the present application, the virtual system further includes: a third inertial sensor disposed on the head-mounted display device, wherein the third inertial sensor is configured to measure IMU data of the head-mounted display device.

In an embodiment of the present application, the virtual system includes: a virtual reality system or an augmented reality system.

The positioning method of the combined controller provided by the present application, the combined controller can form a game device together with a handheld game console; can also constitute a virtual system with a head-mounted display device, which enhances the versatility of the combined controller. In addition, when the control handle of the combined controller is re-installed on the handle housing, re-installed control handle and handle housing need to be recalibrated, which can make the positioning of the combined controller more accurate when the user uses the combined experience virtual function, thereby enhances the fluency of human-computer interaction and further enhancing the user's sense of virtual experience.

BRIEF DESCRIPTION OF THE DRAWINGS

The above and other objects, features and advantages of the present application will become more apparent by describing the embodiments of the present application in more detail with reference to the accompanying drawings. The accompanying drawings are used to provide a further understanding of the embodiments of the present application, and constitute a part of the specification, and are used together with the embodiments of the present application to explain the present application, and do not constitute limitations to the present application. In the accompanying drawings, a same reference symbol is used for representing a same component or step.

DETAILED DESCRIPTION OF THE EMBODIMENTS

Figure 1:
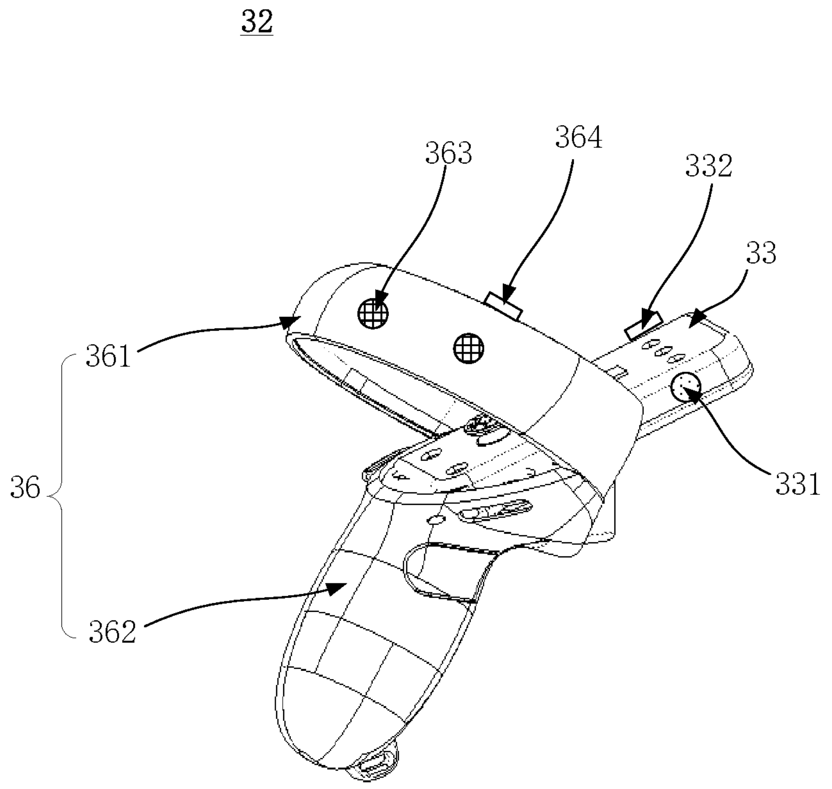
FIG. 1 is a schematic structural view of a combined controller according to an embodiment of the present application.

In the description of the present application, "plurality" means at least two, such as two, three, etc., unless otherwise specifically defined. All directional indications (such as up, down, left, right, front, back, top, bottom . . . ) in the embodiments of the present application are only used to explain the relationship between the components in a certain posture (as shown in the accompanying drawings) If the specific posture changes, the directional indication will also change accordingly. In addition, the terms "include", "comprise", and any variation thereof are intended to cover non-exclusive inclusion. For example, a process, method, system, product, or device that includes a series of steps or units is not necessarily limited to those listed steps or units, but optionally further comprises steps or units that are not listed, or optionally further comprises steps or units that are inherent to such a process, method, system, product, or device.

Additionally, reference herein to "an embodiment" means that a particular feature, structure, or characteristic described in connection with the embodiment can be included in at least one embodiment of the present application. The appearances of such phrase in various places in the specification are not necessarily all referring to a same embodiment, nor are separate or alternative embodiments mutually exclusive of other embodiments. It may be explicitly or implicitly appreciated by those skilled in the art that the embodiments described herein may be combined with other embodiments.

The technical solutions of embodiments of the present application will be described clearly and completely as below with reference to the accompanying drawings of the embodiments of the present application. Apparently, the described embodiments are merely part of the embodiments of the present application, but not all of them. All other embodiments acquired by a person of ordinary skill in the art based on the embodiments of the present application without paying any creative effort shall fall into the protection scope of the present application.

The head-mounted display device needs to be used together with the control handle to have a better experience. For example, for users of virtual reality games, the control of the VR head-mounted display device receives the operation instructions and spatial position information uploaded by the control handle to realize position tracking, game control and other functions of the control handle.

The handheld game console generally realizes the control of the host through the buttons on the control handle, and the control handle is generally installed on side of the host.

Although the control handle of head-mounted display device and the control handle of handheld game console have many similarities in function and button settings, the control handle of the head-mounted display device can only be used in conjunction with the virtual head-mounted display handle, and the control handle of handheld game console can only be used in conjunction with the host in the handheld game console, and the control handle of the head-mounted display device and the control handle of the handheld game console cannot be used interchangeably. That is to say, if the user wants to play games on the head-mounted display device and the handheld game console, he needs to use two different handles. And most of the control handles are a whole at present, that is, each part of the handle cannot be separated, and it is also difficult to realize universal use.

Exemplary Combined Controller

The present application provides a positioning method of a combined controller, which can be applied to a head-mounted display device and a handheld game console. Specifically, referring to FIG. 1, FIG. 1 is a schematic structural view of a combined controller related to an embodiment of the present application, the combined controller 32 includes a control handle 33; a first infrared sensor 331 disposed on the control handle 33; a first inertial sensor 332 disposed on the control handle 33, the first inertial sensor 332 is configured to measure the IMU data of the control handle; a handle housing 36, the handle housing 36 includes an annular portion 361 and a handle portion 362, wherein a recessed portion is provided at the center of the handle portion 362 to accommodate and be fixed with the control handle 33; a second inertial sensor 364 disposed on the handle housing 36, and the second inertial sensor 364 is configured to measure the IMU data of the handle housing 36; and the second infrared sensor 363 disposed on the annular portion 361.

Specifically, the first infrared sensor 331 and the second infrared sensor 363 are provided with miniature infrared lamps for emitting infrared rays. When the miniature infrared lamp is in the state of being turned on, a camera can take images of the miniature infrared lamp, so that the light-spot of the miniature infrared lamp can be captured, and therefore, the position of the light-spot can be determined as the position corresponding to the infrared transmitter. Generally, each of the first infrared sensor 331 and the second infrared sensor 363 is provided with several miniature infrared lights, and the miniature infrared lights of the first infrared sensor 331 forms a light ring, and the miniature infrared lights of the second infrared sensor 363 form a light ring. That is, the first light-spot image of the first infrared sensor 331 and the second light-spot image of the second infrared sensor 363 can be captured by the camera, therefore, the positions of the control handle and the handle housing can be determined respectively through the first light-spot image and the second light-spot image, for example, the degree-of-freedom information of the control handle and the handle housing can be determined through the first light-spot image and the second light-spot image.

The first inertial sensor 332 can detect the IMU data of the control handle 33, that is, the three rotational degrees of freedom data of the control handle 33. The second inertial sensor 364 can detect the IMU data of the handle housing 36, that is, the three rotational degrees of freedom data of the handle housing 36.

The present application provides the combined controller, and the first infrared sensor 331 disposed on the control handle 33 is controlled to emit light, so that the first light-spot image is captured, and the position information of the control handle 33 is determined from the first light-spot image; the first inertial sensor 331 disposed on the control handle 33 can detect the three rotational degrees of freedom data of the control handle 33; the spatial positioning information (six degrees of freedom data) of the control handle is determined according to the first light-spot image and the three rotational degrees of freedom data of the control handle 33. In the same way, by controlling the second infrared sensor 363 on the handle housing 36 to emit light, the second light-spot image is captured, and the position information of the handle housing 36 is determined from the second light-spot image; the second inertial sensor 364 can detect the three rotational degrees of freedom data of the handle housing 36; the spatial positioning information (the data of the six degrees of freedom) of the handle housing 36 is determined according to the second light-spot image and the three rotational degrees of freedom data of the handle housing 36.

Alternatively, the combined controller further includes: a first memory disposed on the control handle 33, the first memory is configured to store the calibrated positioning of the control handle 33; and a second memory disposed on the handle housing 36, the second memory is configured to store the calibrated positioning of the handle housing 36. Since the calibrated positioning of the control handle and the handle housing will be obtained before the combined controller leaves the factory, so as to recalibrate the control handle and the handle housing after the control handle in the combined controller are reinstalled on the handle housing, and store the calibrated positioning of the control handle 33 in the first memory integrated on the control handle 33. The calibrated positioning of the handle housing 36 is stored in a second memory integrated on the handle housing 36.

Alternatively, the combined controller further includes a main control chip disposed on the control handle 33, the main control chip is respectively communicated to the first memory and the second memory; the main control chip is configured to acquire the positioning calibration of the control handle from the first memory, and acquire the calibrated positioning of the handle housing from the second memory.

Since the control handle and the handle housing have been calibrated before the combined controller leaves the factory, when the control handle 33 is reinstalled on the handle housing 36, and the positions of the control handle 33 and the handle housing 36 are recalibrated, the control main control chip directly retrieves the calibrated positioning of the control handle from the first memory, and directly retrieves the calibrated positioning of the handle housing from the second memory.

Exemplary Positioning Method of Combined Controller

Since the control handle in the above-mentioned combined controller is detachably installed at the recess of the gripping portion, when the control handle is used in combination with the handheld game console, the control handle is disassembled from the recess of the gripping portion and then installed on the handheld game console and are used in combination with the handheld game console for the user to experience the game. When the control handle of the combined controller and the head-mounted display device constitute a virtual system, the control handle can be installed at the recess of the gripping portion.

Figure 2:
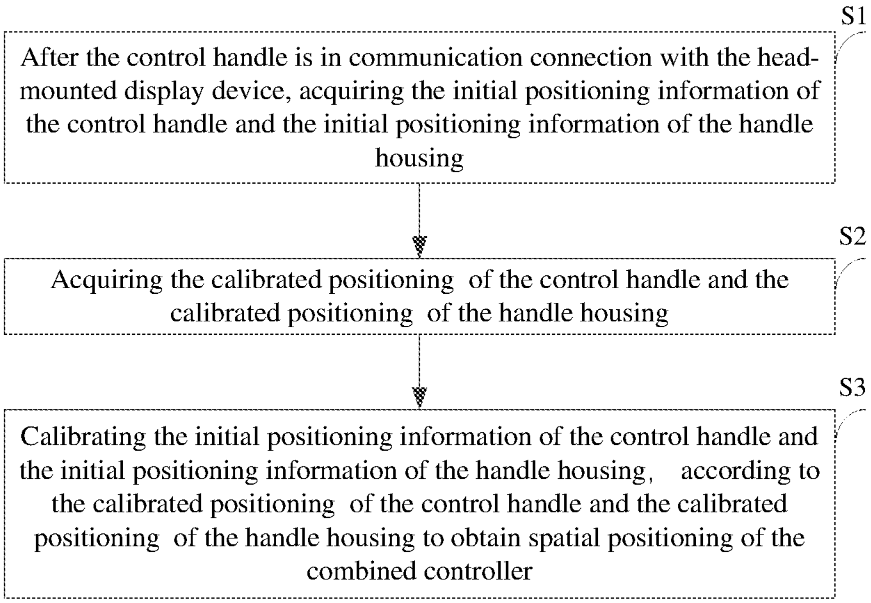
FIG. 2 is a schematic flowchart of a position calibration method of a combined controller provided by an embodiment of the present application.

At this time, the control handle is disassembled and then reinstalled at the recess of the gripping portion. Therefore, when the combined controller and the head-mounted display device constitute a virtual system, the user experiences the virtual scene through the virtual system. When the user uses the virtual system to experience the virtual scene, the combined controller needs to be positioned. Therefore, the present application provides a positioning method of the combined controller. FIG. 2 is a schematic flowchart of a positioning method of the combined controller provided by an embodiment of the present application. The positioning method of the combined controller includes the following steps:

Step S1: After the control handle is in communication connection with the head-mounted display device, acquiring the initial positioning information of the control handle and the initial positioning information of the handle housing;

Specifically, the head-mounted display device includes a virtual helmet and a display installed on the virtual helmet. The control handle may be in communication connection with devices of the head-mounted display device that needs to transmit information such as control instructions and images, for example, the control handle is in communication connection with the display of the head-mounted display device; for example the head display device has sensors, and when the user wears a virtual helmet, the sensor will transmit the induction model to the control handle. The control handle determines that the control handle performs a virtual function according to the sensing signal, that is, the control handle and the head display device together constitute a virtual system. At this time, the control handle promptly acquires a communication connection with the sensor.

It is understandable that no matter whether the control handle is communicated to any device of the head-mounted display device, it can indicate that the control handle needs to perform virtual functions, that is, the control handle and the head-mounted device constitute a virtual system. Therefore, it is determined that the specific manner in which the communication connection between the control handle and the head-mounted display device is not limited, as long as the control handle and the head-mounted device can be represented to form the virtual system together, so that the user can experience the virtual scene.

When it is determined that the control handle is in communication connection with the head-mounted display device, that is, it indicates that the control handle and the head-mounted device constitute a virtual system, and the user can wear the head-mounted display device and control the control handle to experience the virtual scene for the user to experience the virtual scene. When the user experiences the virtual scene, the user's actions in the real environment are mapped in the virtual system. At this time, it is necessary to acquire the spatial positioning information of the combined controller. Since the combined controller includes the control handle and the handle housing, it is necessary to locate and track the control handle and he handle housing performs, therefore, it is necessary to acquire the initial positioning information of the control handle and the initial positioning information of the handle housing.

Step S2: Acquiring the calibrated positioning of the control handle and the calibrated positioning of the handle housing;

Since the control handle of the combined controller and the handheld game console can form a game device, the combined controller and the head-mounted display device can constitute a virtual system for users to experience virtual scenes. Therefore, when the control handle of the combined controller is combined with the head-mounted display device after being constituted a virtual system with the handheld game console, the control handle is reinstalled after being disassembled from the handle housing. Therefore, when the control handle is reinstalled on the handle housing, the relative position between the reinstalled control handle and the handle housing is biased. Therefore, it is necessary to acquire the calibrated positioning of the reinstalled control handle and the calibrated positioning of the handle housing.

Alternatively, the calibrated positioning of the control handle includes the position offset of the control handle and the rotation offset of the control handle; the calibrated positioning of the handle housing includes the position offset of the handle housing and the rotation offset of the handle housing.

Step S3: Calibrating the initial positioning information of the control handle and the initial positioning information of the handle housing, according to the calibrated positioning of the control handle and the calibrated positioning of the handle housing to obtain spatial positioning of the combined controller.

According to the calibrated positioning of the control handle and the calibrated positioning of the handle housing acquired in Step S2, the initial positioning information of the control handle and the initial positioning information of the handle housing acquired in Step S1 are calibrated to acquire the spatial positioning information of the combined controller.

The positioning method of the combined controller provided by the present application, the combined controller can form a game device with a handheld game console; can also constitute a virtual system with a head-mounted display device, which enhances the versatility of the combined controller. In addition, when the control handle is re-installed on the handle housing, re-installed control handle and handle housing need to be recalibrated, which can make the positioning of the combined controller more accurate when the user uses the combined experience virtual function, thereby the fluency of human-computer interaction can be enhanced and the user's sense of virtual experience can be further enhanced.

Figure 3:
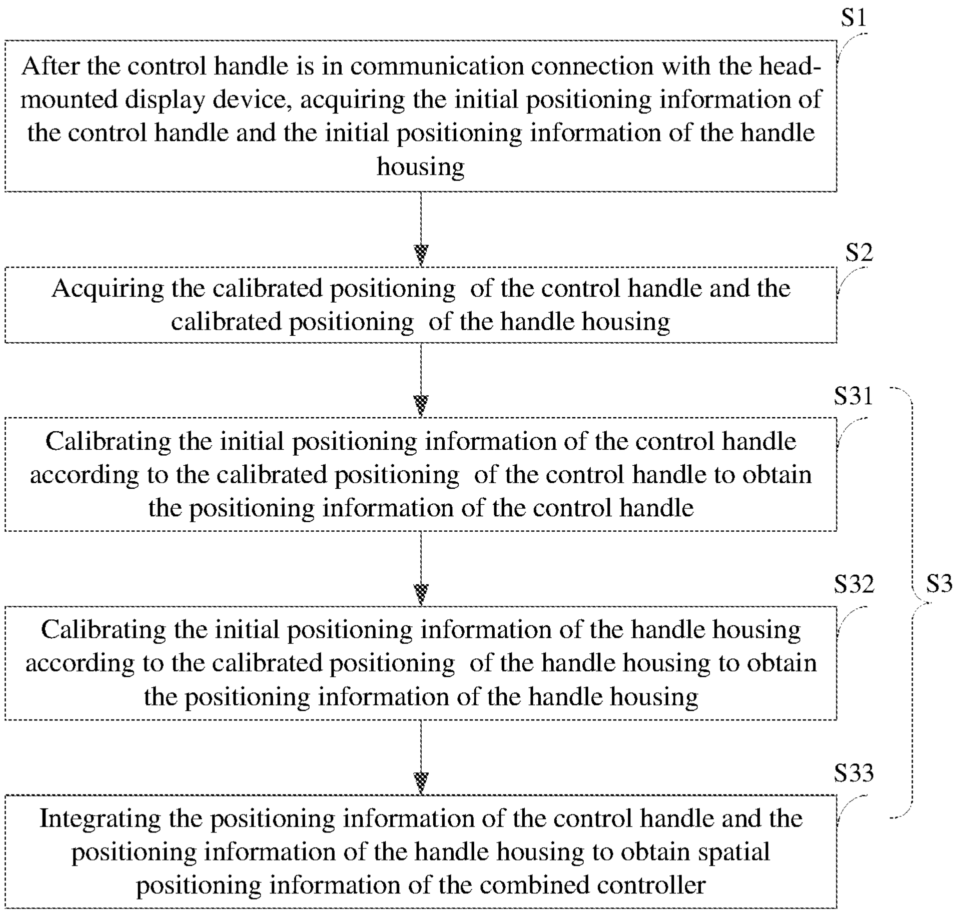
FIG. 3 is a schematic flowchart of a position calibration method of a combined controller provided by another embodiment of the present application.

In an embodiment of the present application, FIG. 3 is a schematic flowchart of a positioning method of a combined controller provided in another embodiment of the present application. As shown in FIG. 3, Step S3 in the positioning method of the combined controller (calibrating the initial positioning information of the control handle and the initial positioning information of the handle housing according to the calibrated positioning of the control handle and the calibrated positioning of the handle housing to obtain spatial positioning information of the combined controller) specifically including the following steps:

Step S31: Calibrating the initial positioning information of the control handle according to the calibrated positioning of the control handle to obtain the positioning information of the control handle;

That is, calibrating the initial positioning information of the control handle according to the calibrated positioning of the control handle, so as to enhance the accuracy of the positioning information of the control handle.

Specifically, the positioning calibration of the control handle can be pre-calibrated and stored. For example, the control handle and the handle housing are calibrated before the combined controller leaves the factory, and the calibrated positioning of the control handle and the calibrated positioning of the control handle housing are stored.

Step S32: Calibrating the initial positioning information of the handle housing according to the calibrated positioning of the handle housing to obtain the positioning information of the handle housing;

That is, calibrating the initial positioning information of the handle housing according to the calibrated positioning of the handle housing, so as to enhance the accuracy of the positioning information of the handle housing.

Step S33: Integrating the positioning information of the control handle and the positioning information of the handle housing to obtain spatial positioning information of the combined controller.

The calibrated positioning information of the control handle and the calibrated positioning information of the handle housing are integrated to acquire the spatial positioning information of the combined controller, which enhances the positioning accuracy of the combined controller.

Figure 4:
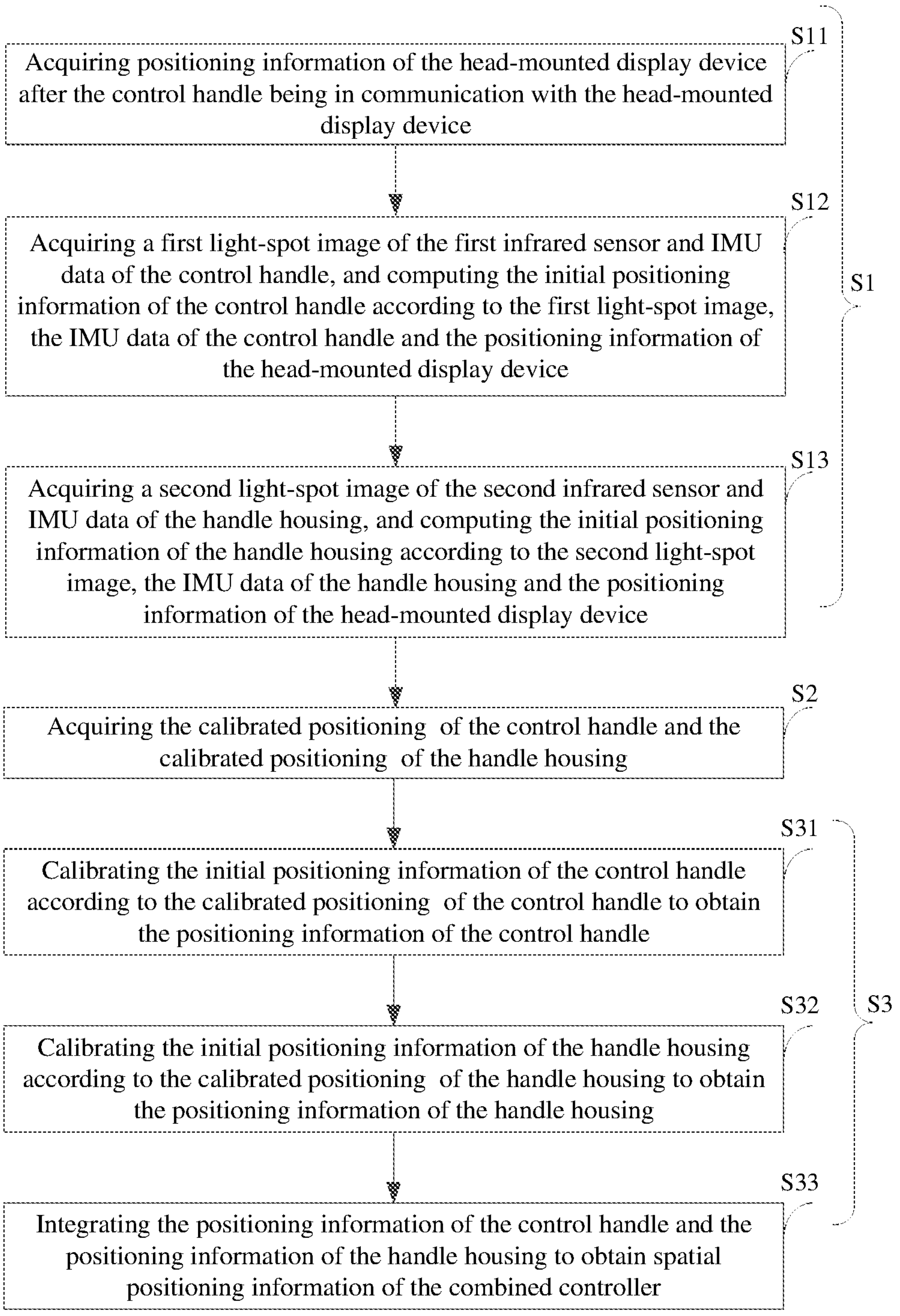
FIG. 4 is a schematic flowchart of a position calibration method of a combined controller provided by another embodiment of the present application.

In an embodiment of the present application, FIG. 4 is a schematic flowchart of a positioning method of a combined controller provided by another embodiment of the present application. As shown in FIG. 4, Step S1 (after the control handle is in communication connection with the head-mounted display device, acquiring the initial positioning information of the control handle and the initial positioning information of the handle housing) specifically includes the following steps:

Step S11: Acquiring positioning information of the head-mounted display device after the control handle being in communication with the head-mounted display device;

Step S12: Acquiring a first light-spot image of the first infrared sensor and IMU data of the control handle, and computing the initial positioning information of the control handle according to the first light-spot image, the IMU data of the control handle and the positioning information of the head-mounted display device;

Specifically, the first infrared sensor is provided with a miniature infrared lamp that emits infrared rays. When the miniature infrared lamp is turned on, it can be captured by a camera to obtain the light spot of the miniature infrared lamp, so the position of the light spot can be determined as the corresponding infrared emission location of the device. Generally, each first infrared sensor is provided with several miniature infrared lamps, and the miniature infrared lamps of the first infrared sensor form a lamp ring. That is, the first light-spot image of the first infrared sensor can be captured by the camera, and therefore, the first light-spot image of the first infrared sensor can be acquired from the camera.

After the disassembled control handle is reinstalled, the miniature infrared lamps of the first infrared sensor are turned on and captured by the camera to obtain the first light-spot image of the light spot of the miniature infrared lamp including the first infrared emitter.

Specifically, an inertial sensor (Inertial Measurement Unit, IMU for short) is an apparatus for measuring the three-axis posture angle (or rotation velocity) and acceleration of an object. Generally, one IMU includes three single-axis accelerometers and three single-axis gyroscopes. The accelerometer detects the acceleration signal of the object on the independent three-axis in the carrier coordinate system, and the gyroscope detects the rotation velocity signal of the carrier relative to the navigation coordinate system. Therefore, the inertial sensor can measure the rotation velocity and acceleration of the object in three-dimensional space, and then compute the posture of the object, for example, compute the rotational degree-of-freedom of the object, and the rotational freedom of degree refers to degrees of freedom related to three positions of up-down, front-back, left and right positions. The IMU data is the result data of the object detected by the inertial sensor, that is, the rotation velocity and acceleration data of an object in three-dimensional space detected by the inertial sensor. Therefore, the first inertial sensor disposed on the control handle can detect IMU data of the control handle, and the IMU data of the control handle may be used to compute the posture of the control handle, such as the rotational degree-of-freedom of the control handle. The rotational degree-of-freedom refers to the degrees of freedom related to the three positions of up and down, front and rear, and left and right.

In summary, the six degree-of-freedom (6 DOF) data of the control handle can be determined according to the first light-spot image and the IMU data of the control handle detected by the first inertial sensor, that is, the 6 DOF data of the control handle.

The initial positioning information of the control handle can be determined according to the 6 DOF data of the control handle and the positioning information of the head-mounted display device.

Step S13: Acquiring a second light-spot image of the second infrared sensor and IMU data of the handle housing, and computing the initial positioning information of the handle housing according to the second light-spot image, the IMU data of the handle housing and the positioning information of the head-mounted display device.

In the same way, the second infrared sensor is provided with a miniature infrared lamp that emits infrared rays. When the miniature infrared lamp is turned on, it can be captured by a camera to obtain the light spot of the miniature infrared light, so the position of the light spot can be determined as the corresponding infrared emission location of the device. Generally, each second infrared sensor is provided with several miniature infrared lamps, and the miniature infrared lamps of the second infrared sensor form a lamp ring. That is, the second light-spot image of the second infrared sensor can be captured by the camera, and therefore, the second light-spot image of the second infrared sensor can be acquired from the camera.

After the disassembled control handle is reinstalled, the miniature infrared lamps of the second infrared emitter are turned on, by means of the camera, a second light-spot image including the miniature infrared light spot of the second infrared emitter can be obtained, and translation IMU data of the handle housing can be determined by the second light-spot image;

The second inertial sensor disposed on the handle housing can detect the IMU data of the handle housing; therefore, the IMU data of the handle housing can be acquired from the second inertial sensor. And the IMU data of the handle housing may be used to compute the posture of the handle housing, such as to obtain the rotational degree-of-freedom of the handle housing. The rotational degree-of-freedom refers to the degrees of freedom related to the three positions of up and down, front and rear, and left and right. According to the second light-spot image and the IMU data of the handle housing detected by the second inertial sensor, the six degrees of freedom data of the handle housing can be determined, that is, the 6 DOF data of the handle housing.

The initial positioning information of the handle housing can be determined according to the 6 DOF data of the handle housing and the positioning information of the head-mounted display device.

When a user uses a virtual reality device, the head-mounted display device is worn on the head to view the game interface through a display on the head-mounted display device; at the same time, the buttons on the control handle are operated by both hands to obtain action control instructions. The action control instructions include forward, backward, left, right, rotation, jumping and so on. When the user's head and hands move, the corresponding position information changes, determine and record the six degrees of freedom data of the combined controller and the six degrees of freedom data of the head-mounted display device, and determine the motion trajectory of the combined controller according to the change of the six degrees of freedom data of the combined controller, and determine the motion trajectory of the head-mounted display device according to the change of the six degrees of freedom data of the head-mounted display device. It realizes the generation of corresponding human-computer interaction based on the motion trajectory, for example, converting the displayed scene of the game interface according to the motion trajectory. Therefore, after the motion trajectory is determined, the display page is controlled to switch, and the corresponding game action is obtained according to the action control instruction sent by the combined controller.

It should be noted that the camera capturing the first light-spot image of the first infrared sensor and the camera capturing the second light-spot image of the second infrared sensor may be the same camera or different cameras. For example, the camera capturing the first light-spot image and the camera capturing the second light-spot image are the same camera and may be disposed on the head-mounted display device; when the head-mounted display device includes the helmet and the mobile terminal, the camera may be disposed on the helmet, or may be disposed on the mobile terminal. For example, the camera capturing the first light-spot image and the camera capturing the second light-spot image are not the same camera, for example, the camera capturing the first light-spot image can be a fixed camera arranged in the space, and the camera capturing the second light-spot image can be a camera arranged on the head-mounted display device.

Figure 5:
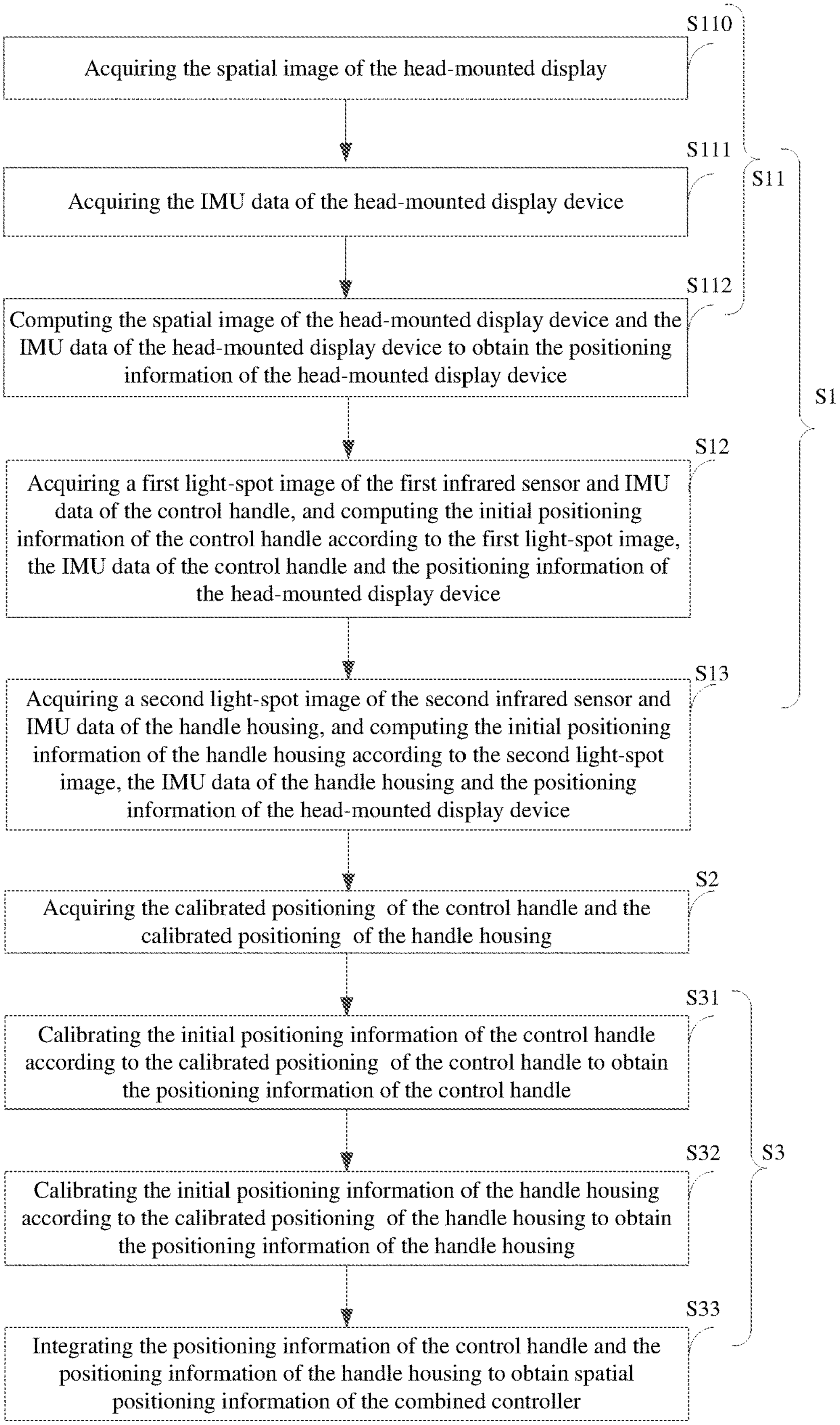
FIG. 5 is a schematic flowchart of a position calibration method of a combined controller provided by another embodiment of the present application.

In one embodiment of the present application, FIG. 5 is a schematic flowchart of a positioning method of a combined controller provided by another embodiment of the present application. As shown in FIG. 5, Step S11 (Acquiring positioning information of the head-mounted display device after the control handle being in communication with the head-mounted display device) specifically includes the following steps:

Step S110: Acquiring the spatial image of the head-mounted display;

Specifically, the spatial image of the head-mounted display device may be captured by a camera, for example, a camera may be disposed on the head-mounted display device, and the camera may capture a spatial image of the head-mounted display device. When the head-mounted display device includes a helmet and a mobile terminal, the camera may be disposed on the helmet, or the camera may be a rear camera of the mobile terminal.

The position information of the head-mounted display device in the space can be determined according to the spatial image of the head-mounted display device.

Step S111: Acquiring the IMU data of the head-mounted display device;

Specifically, the IMU data of the head-mounted display device may be detected by a third inertial sensor disposed on the head-mounted display device, that is, the third inertial sensor may detect the IMU data of the head-mounted display device.

Step S112: Computing the spatial image of the head-mounted display device and the IMU data of the head-mounted display device to obtain the positioning information of the head-mounted display device.

According to the spatial image of the head-mounted display device and the IMU data of the head-mounted display device, the six degrees of freedom data of the head-mounted display device, that is, 6 DOF data, can be determined. The positioning information of the head-mounted display device is six degrees of freedom data of the head-mounted display device.

Figure 6:
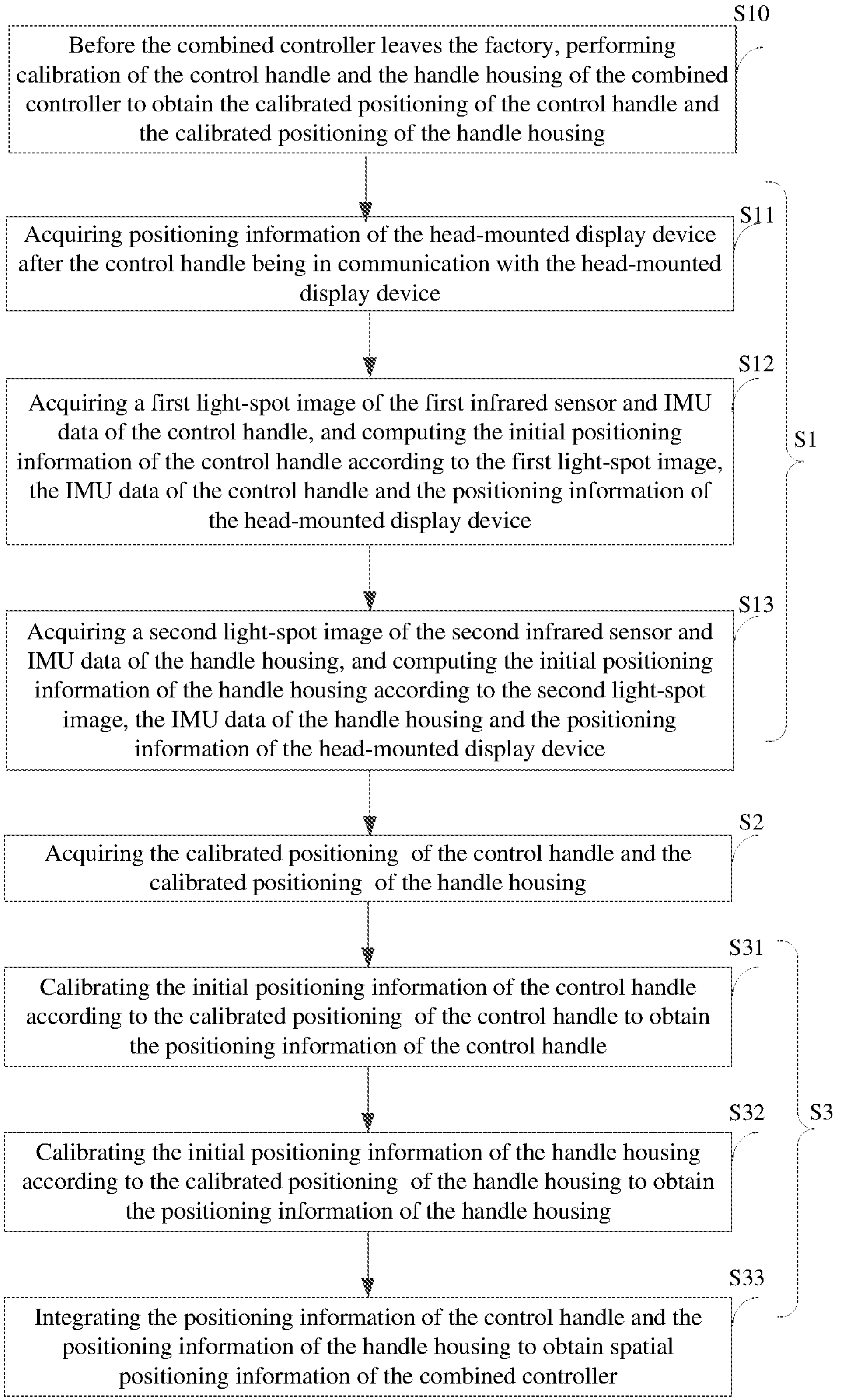
FIG. 6 is a schematic flowchart of a position calibration method of a combined controller provided by another embodiment of the present application.

In an embodiment of the present application, FIG. 6 is a schematic flowchart of a positioning method of a combined controller provided by another embodiment of the present application. As shown in FIG. 6, before Step S1 (after the control handle is in communication connection with the head-mounted display device, acquiring the initial positioning information of the control handle and the initial positioning information of the handle housing), the positioning method of the combined controller further includes the following steps:

Step S10: Before the combined controller leaves the factory, performing calibration of the control handle and the handle housing of the combined controller to obtain the calibrated positioning of the control handle and the calibrated positioning of the handle housing.

That is, the calibrated positioning of the control handle and the calibrated positioning of the handle housing in Step S2 are both the calibration values after performing pre-delivery calibration before delivery of the combined controller.

Figure 7:
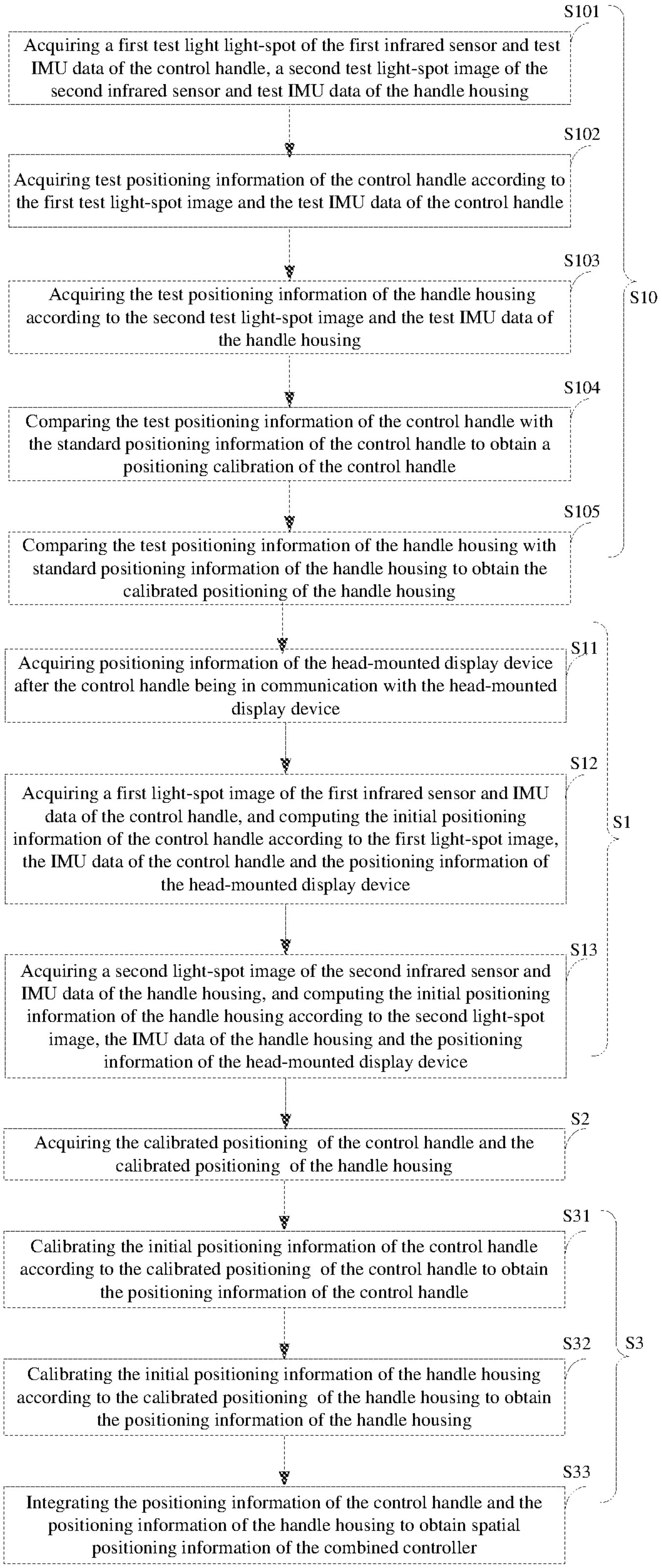
FIG. 7 is a schematic flowchart of a position calibration method of a combined controller provided by another embodiment of the present application.

Specifically, as shown in FIG. 7, Step S10 (performing calibration of the control handle and the handle housing of the combined controller to obtain the calibrated positioning of the control handle and the calibrated positioning of the handle housing) specifically include the following steps:

Step S101: Acquiring a first test light light-spot of the first infrared sensor and test IMU data of the control handle, a second test light-spot image of the second infrared sensor and test IMU data of the handle housing;

Before the combined controller leaves factory, the first test light-spot image of the first infrared sensor disposed on the control handle and the second test light-spot image of the second infrared sensor on the handle housing are captured by the camera; the first inertial sensor detects the test the IMU data of the control handle and the second inertial sensor disposed on the handle housing detects the test the IMU data of the handle housing.

Step S102: Acquiring test positioning information of the control handle according to the first test light-spot image and the test IMU data of the control handle;

The test position information of the control handle can be determined through the first test light-spot image, and the test angle information of the control handle can be determined through the IMU data of the control handle.

Step S103: Acquiring the test positioning information of the handle housing according to the second test light-spot image and the test IMU data of the handle housing;

The test position information of the handle housing can be determined through the second test light-spot image, and the test angle information of the handle housing can be determined through the IMU data of the handle housing.

Step S104: Comparing the test positioning information of the control handle with the standard positioning information of the control handle to obtain a positioning calibration of the control handle;

Specifically, the calibrated positioning of the control handle includes a first position offset and a first rotation offset; the standard positioning information of the control handle includes a first standard positioning and a first standard angle.

The test position information of the control handle is determined according to the first test light-spot image, and the first position offset is determined according to the test position information and the first standard positioning in the standard positioning information.

The test angle information of the control handle is determined according to the test the IMU data of the control handle, and the first rotation offset is determined according to the test angle information and the first standard angle in the standard positioning information.

Step S105: Comparing the test positioning information of the handle housing with standard positioning information of the handle housing to obtain the calibrated positioning of the handle housing.

Specifically, the calibrated positioning of the handle housing includes a second position offset and a second rotation offset; the standard positioning information of the handle housing includes a second standard positioning and a second standard angle.

The test position information of the handle housing is determined according to the second test light-spot image, and the second position offset is determined according to the test position information and the second standard positioning in the standard positioning information.

The test angle information of the handle housing is determined according to the test the IMU data of the handle housing, and the second rotation offset is determined according to the test angle information and the second standard angle in the standard positioning information.

After the control handle is installed on the handle, and before the control handle leaves the factory, it is necessary to calibrate the control handle and the handle housing to obtain the calibrated positioning. In subsequent use, if the control handle of the combined controller is disassembled and then reassembled, the positions of the control handle and the handle housing are calibrated according to the calibrated positioning, and then the motion trajectory of the combined controller is tracked.

Figure 8:
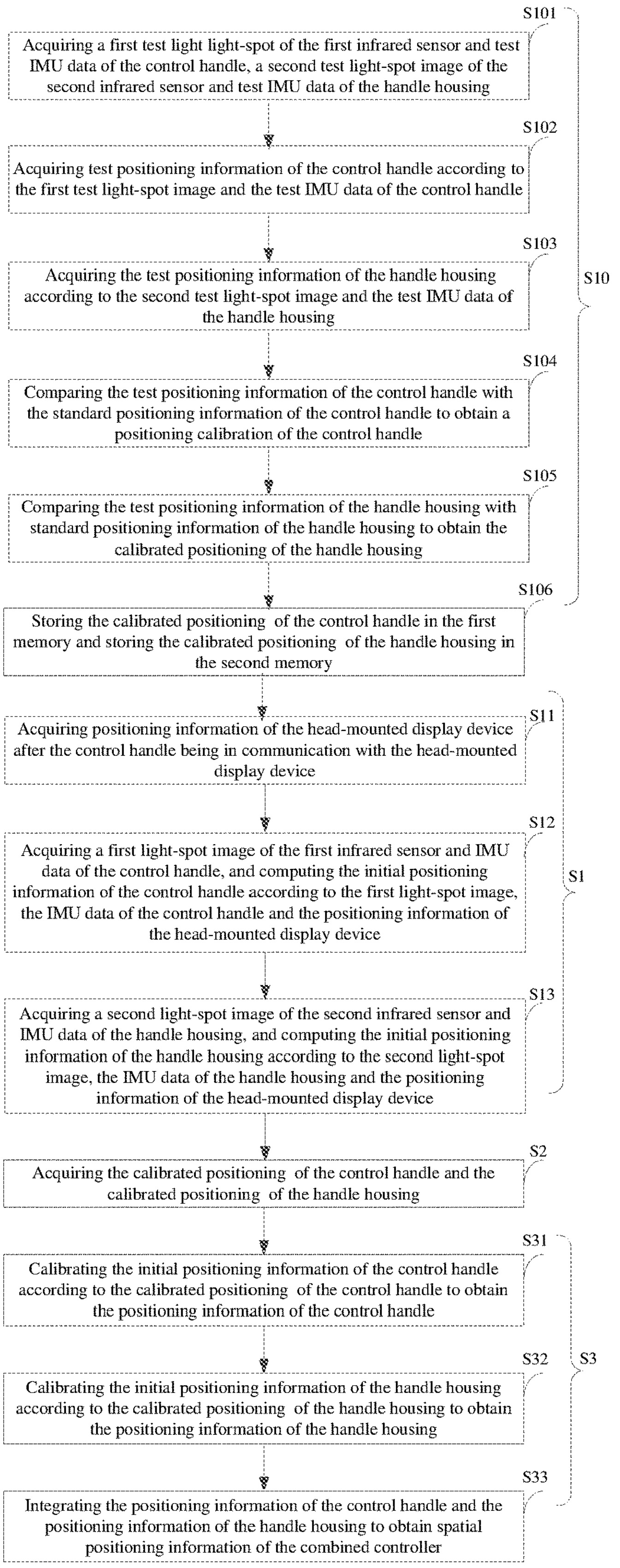
FIG. 8 is a schematic flowchart of a position calibration method of a combined controller provided by another embodiment of the present application.

In an embodiment of the present application, the combined controller further includes a first memory disposed on the handle and a second memory disposed on the handle housing; as shown in FIG. 8, after Step S105 and before Step S2, the positioning method of the combined controller also includes:

Step S106: Storing the calibrated positioning of the control handle in the first memory and storing the calibrated positioning of the handle housing in the second memory;

That is, before the control handle leaves factory, after the calibrated positioning of the control handle and the calibrated positioning of the handle housing are determined, the calibrated positioning of the control handle is stored in the first memory disposed on the control handle, and the calibrated positioning of the handle housing is stored in the second memory disposed on the handle housing. The present application stores the calibrated positioning of the control handle and the calibrated positioning of the handle housing in different memories, which facilitates accurate extraction of the calibrated positioning and reduces the probability of data loss.

When the calibrated positioning is stored respectively, acquiring the calibrated positioning of the control handle and the calibrated positioning of the handle housing are respectively retrieved from the first memory and the second memory. i.e. Step S2 (acquiring the calibrated positioning of the control handle and the calibrated positioning of the handle housing) specifically include:

Step S21: Acquiring the calibrated positioning of the control handle from the first memory and acquiring the calibrated positioning of the handle housing from the second memory respectively.

Exemplary Positioning Controller

Figure 9:
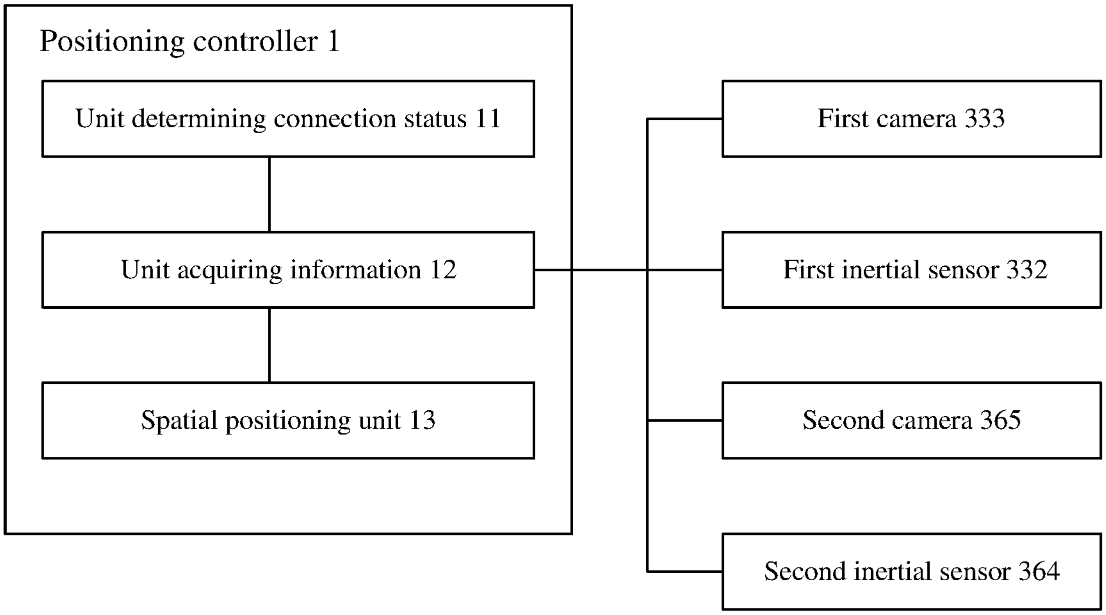
FIG. 9 is a working principle diagram of the positioning controller of the combined controller provided by an embodiment of the present application.

As the third aspect of the present application, the present application also provides a positioning controller for a combined controller, which can be integrated in a head-mounted display device or a control handle in the combined controller. FIG. 9 is a working principle diagram of the positioning controller of the combined controller provided by an embodiment of the present application. As shown in FIG. 9 and combined with FIG. 1, the positioning controller 1 of the combined controller includes:

a unit determining connection status 11, configured to determine the connection state between the control handle and the head-mounted display device;

Specifically, the head-mounted display device includes a virtual helmet and a display installed on the virtual helmet. The control handle may be in communication connection with devices of the head-mounted display device that needs to transmit information such as control instructions and images, for example, the control handle is in the communication connection with the display of the head-mounted display device; there is a sensor on the head-mounted display device, and the sensor communicates with the unit determining connection status 11. When the user wears the virtual helmet, the sensor transmits the induction signal to the unit determining connection status 11, and according to the induction signal, the unit determining connection status 11 controls the control handle to perform virtual function, that is, the control handle and the head-mounted display device constitute a virtual system, and, the control handle is communicated to the sensor.

an unit acquiring information 12, configured to acquire initial positioning information of the control handle and initial positioning information of the handle housing, and acquire the calibrated positioning of the control handle and the calibrated positioning of the handle housing.

That is, the unit acquiring information 12 executes Step S1 and Step S2 in the positioning method of the combined controller described above.

Specifically, as shown in FIG. 9, the unit acquiring information 12 is in communication connection with the first camera 333 capturing the first light-spot image of the first infrared sensor 331 on the control handle 33, the second camera 365 capturing the second light-spot image of the second infrared sensor 363, the first inertial sensor 332 disposed on the control handle 33, and the second inertial sensor 364 disposed on the annular portion 361 on the handle housing. The unit acquiring information 12 acquires the first light-spot image of the first infrared sensor 331 from the first camera 333, acquires the IMU data of the control handle 33 from the first inertial sensor 332, and determines the initial positioning information of the control handle 33 according to the first light-spot image and the IMU data of the control handle 33. The unit acquiring information 12 acquires the second light-spot image of the second infrared sensor 363 from the second camera 365, the IMU data of the handle housing 36 from the second inertial sensor 364, and determines the initial positioning information of the handle housing 36 according to the second light-spot image and the IMU data of the handle housing 36.

a spatial positioning unit 13, configured to calibrate the initial positioning information of the control handle and the initial positioning information of the handle housing according to the calibrated positioning of the control handle and the calibrated positioning of the handle housing to obtain spatial positioning information of the combined controller.

That is, the spatial positioning unit 13, configured to execute Step S3 in the positioning method of the combined controller described above.

Specifically, the spatial positioning unit 13 is in communication connection with the unit acquiring information 12, and the spatial positioning unit 13 acquires the initial positioning data of the control handle and the initial positioning data of the handle housing from the unit acquiring information 12, and calibrate the initial positioning information of the control handle and the initial positioning information of the handle housing according to the calibrated positioning of the control handle and the calibrated positioning of the handle housing to obtain spatial positioning information of the combined controller.

Figure 10:
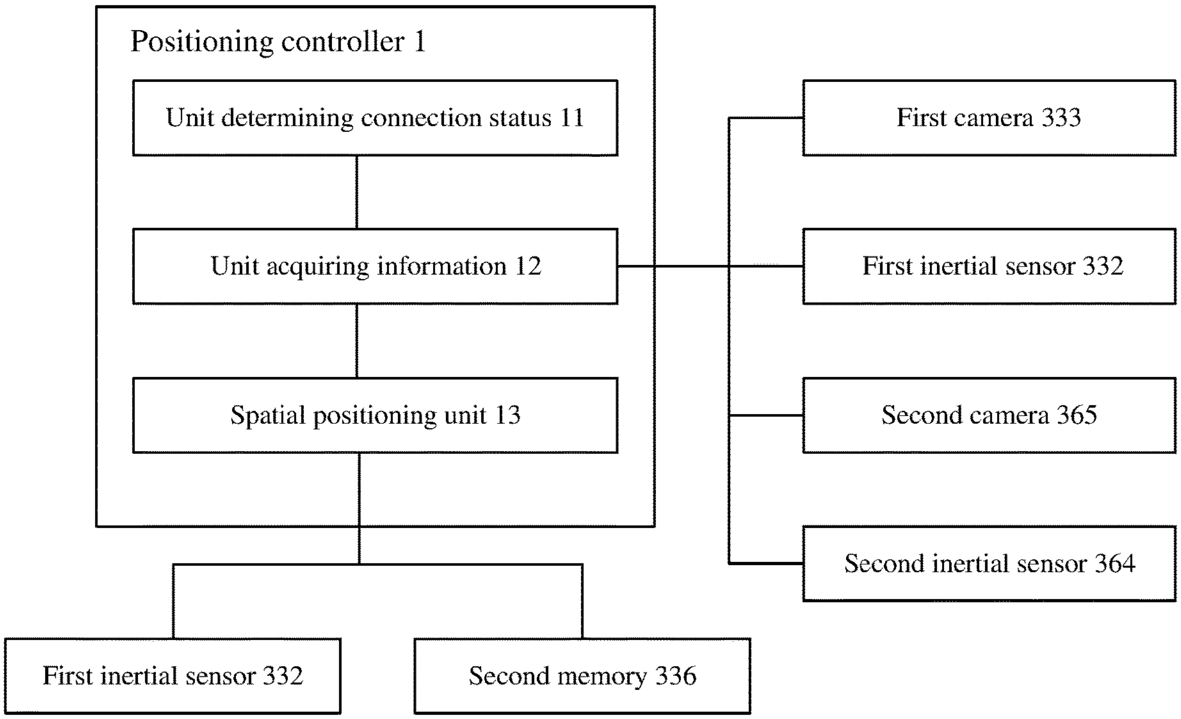
FIG. 10 shows the working principle diagram of the positioning controller of the combined controller provided by another embodiment of the present application.

Specifically, as shown in FIG. 10, the calibrated positioning of the control handle and the calibrated positioning of the handle housing are respectively stored in the first memory 333 and the second memory 366, wherein the first memory 333 is integrated in the control handle 33, and the second memory 333 is integrated in the control handle 33. The spatial positioning unit 13 is respectively in communication connection with the first memory 333 and the second memory 336, and the spatial positioning unit 13 acquires the calibrated positioning of the control handle from the first memory 333 and acquires the calibrated positioning of the handle housing from the second memory 336.

The positioning method of the combined controller provided by the present application, when the combined controller can form a game device together with a handheld game console, can also constitute a virtual system with a head-mounted display device, which enhances the versatility of the combined controller. In addition, when the control handle is re-installed on the handle housing, re-installed control handle and handle housing need to be recalibrated, which can make the positioning of the combined controller more accurate, thereby the fluency of man-machine interaction can be enhanced and the user's sense of virtual experience can be further enhanced.

Figure 11:
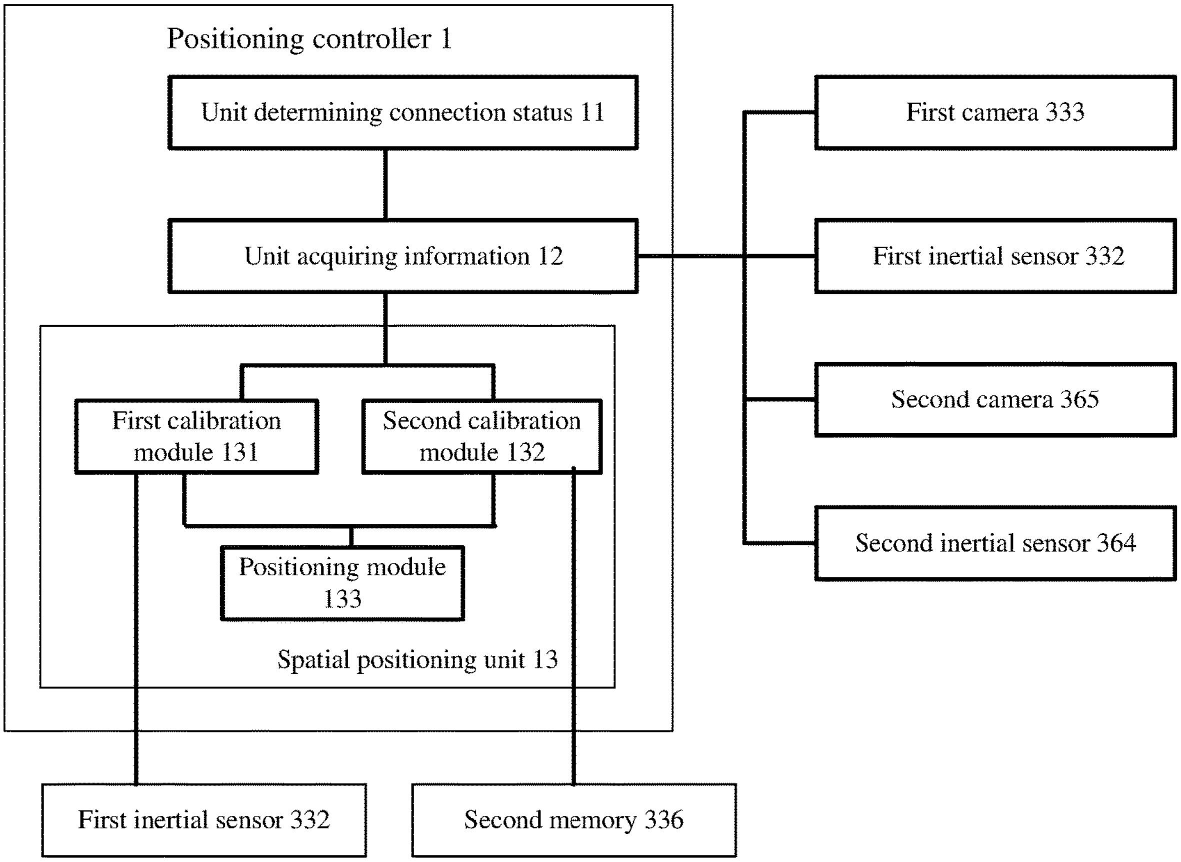
FIG. 11 shows the working principle diagram of the positioning controller of the combined controller provided by another embodiment of the present application.

In an embodiment of the present application, FIG. 11 is a working principle diagram of the positioning controller of the combined controller provided in an embodiment of the present application. As shown in FIG. 11, the spatial positioning unit 13 includes:

a first calibration module 131, configured to calibrate the initial positioning information of the control handle according to the calibrated positioning of the control handle to obtain the positioning information of the control handle;

Specifically, the first calibration module 131 is in communication connection with the unit acquiring information 12, and the first calibration module 131 acquires the calibrated positioning of the control handle from the unit acquiring information 12. The first calibration module 131 may be in communication connection with the first memory 333 storing a calibrated positioning of the control handle, and the calibrated positioning of the control handle is acquired from the first memory 333. When the first calibration module 131 acquires the initial positioning information of the control handle and the calibrated positioning of the control handle, the first calibration module 131 calibrates the initial positioning information of the control handle according to the calibrated positioning of the control handle to obtain the positioning information of the control handle.

a second calibration module 132, configured to calibrate the initial positioning information of the handle housing according to the calibrated positioning of the handle housing to obtain the positioning information of the handle housing;

Specifically, the second calibration module 132 is in communication connection with the unit acquiring information 12, and the second calibration module 132 acquires the calibrated positioning of the handle housing from the unit acquiring information 12. The first calibration module 131 may be in communication connection with the second memory 366, and the calibrated positioning of the handle housing is acquired from the second memory 336. After the second calibration module 132 acquires the initial positioning information of the handle housing and the calibrated positioning of the handle housing, the second calibration module 132 calibrates the initial positioning information of the handle housing to obtain the positioning information of the handle housing according to the calibrated positioning of the handle housing.

a positioning module 133, configured to integrate the positioning information of the control handle and the positioning information of the handle housing to obtain spatial positioning information of the combined controller.

The positioning module 133 communicates with the first calibration module 131 and the second calibration module 132 respectively, and receives the positioning information of the control handle from the first calibration module 131 and the positioning information of the handle housing from the second calibration module 132, and integrates the positioning information of the control handle and the positioning information of the handle housing to obtain the spatial positioning information of the combined controller.

Figure 12:
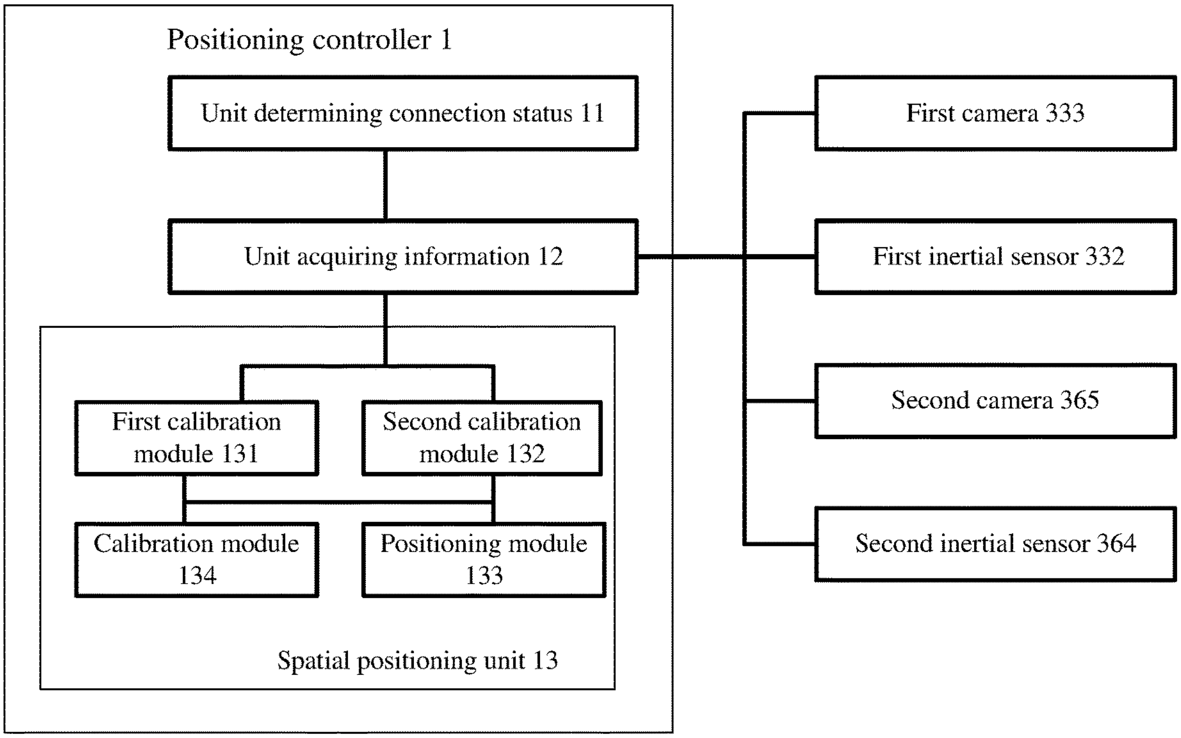
FIG. 12 shows the working principle diagram of the positioning controller of the combined controller provided by another embodiment of the present application.
Figure 13:
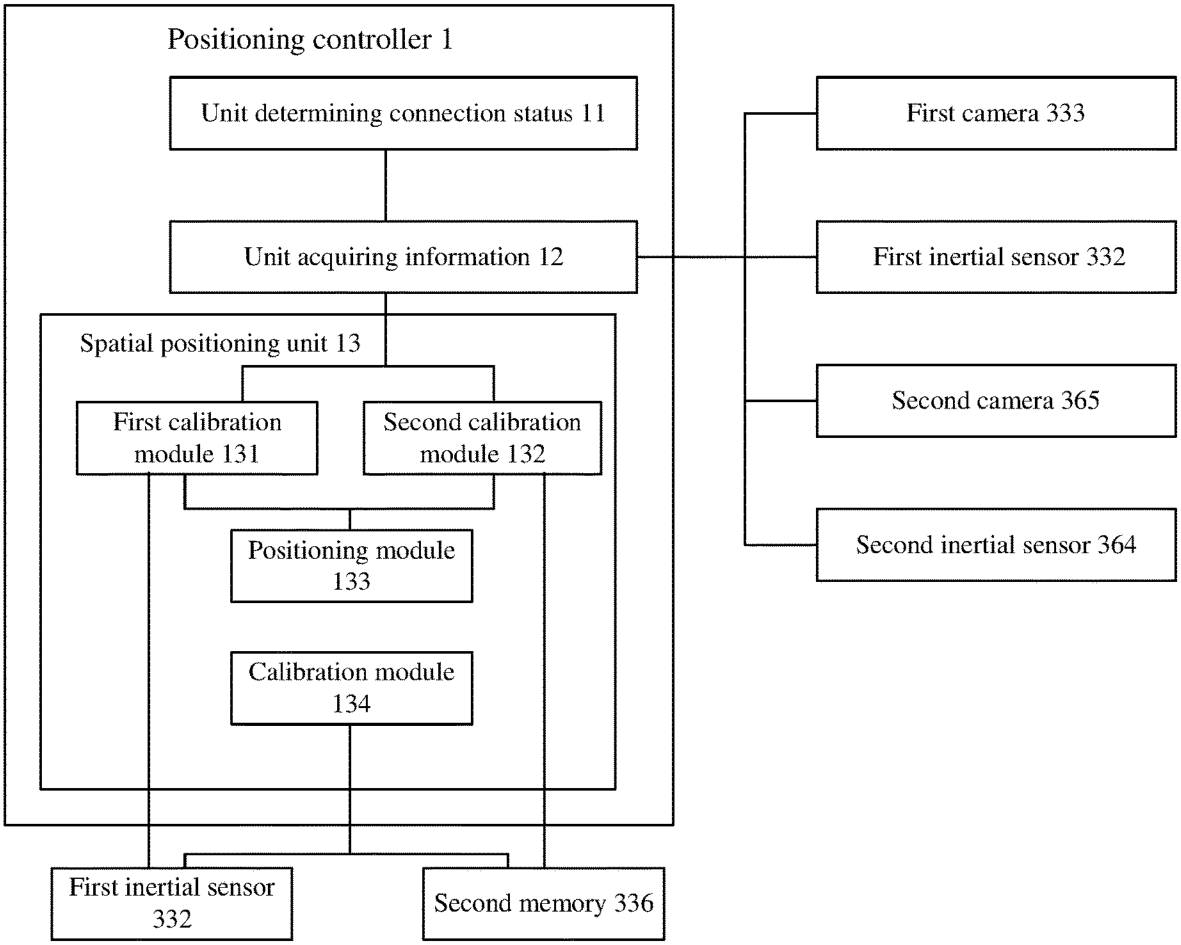
FIG. 13 shows the working principle diagram of the positioning controller of the combined controller provided by another embodiment of the present application.

In an embodiment of the present application, FIG. 12 and FIG. 13 show the working principle diagram of the positioning controller of the combined controller provided by one embodiment of the present application. As shown in FIG. 12 and FIG. 13, the spatial positioning unit 13 further includes:

a calibration module 134, configured to perform calibration of the control handle and the handle housing of the combined controller before the combined controller leaves the factory, and obtain the calibrated positioning of the control handle and the calibrated positioning of the handle housing.

Specifically, as shown in FIG. 12, after the calibration module 134 completes the calibration of the combined controller, the calibrated positioning of the control handle and the calibrated positioning of the handle housing are stored in the factory calibration module 134. The calibration module 134 is in communication connection with the first calibration module 131 and the second calibration module 132. Both the first calibration module 131 and the second calibration module 132 can acquire the calibrated positioning of the control handle and the calibrated positioning of the handle housing from the calibration module 134.

In addition, as shown in FIG. 13, after the calibration module 134 completes the calibration of the combined controller, it can store the calibrated positioning of the control handle in the first memory 333 integrated in the control handle, and can store the calibrated positioning of the handle housing in the second memory 366 integrated in the handle housing, and the factory calibration module 134 communicates with the first memory 333 and the second memory 366 respectively, and stores the calibrated positioning of the control handle in the integrated control handle in the first memory 333, the calibrated positioning of the handle housing is stored in the second memory 366 integrated in the handle housing. The first calibration module 131 is in communication connection with the first memory 333, and the first calibration module 131 can retrieve the calibrated positioning of the control handle from the first memory 333. The second calibration module 132 is in communication connection with the second memory 366, and the second calibration module 132 can retrieve the calibrated positioning of the handle housing from the second memory 366.

Figure 14:
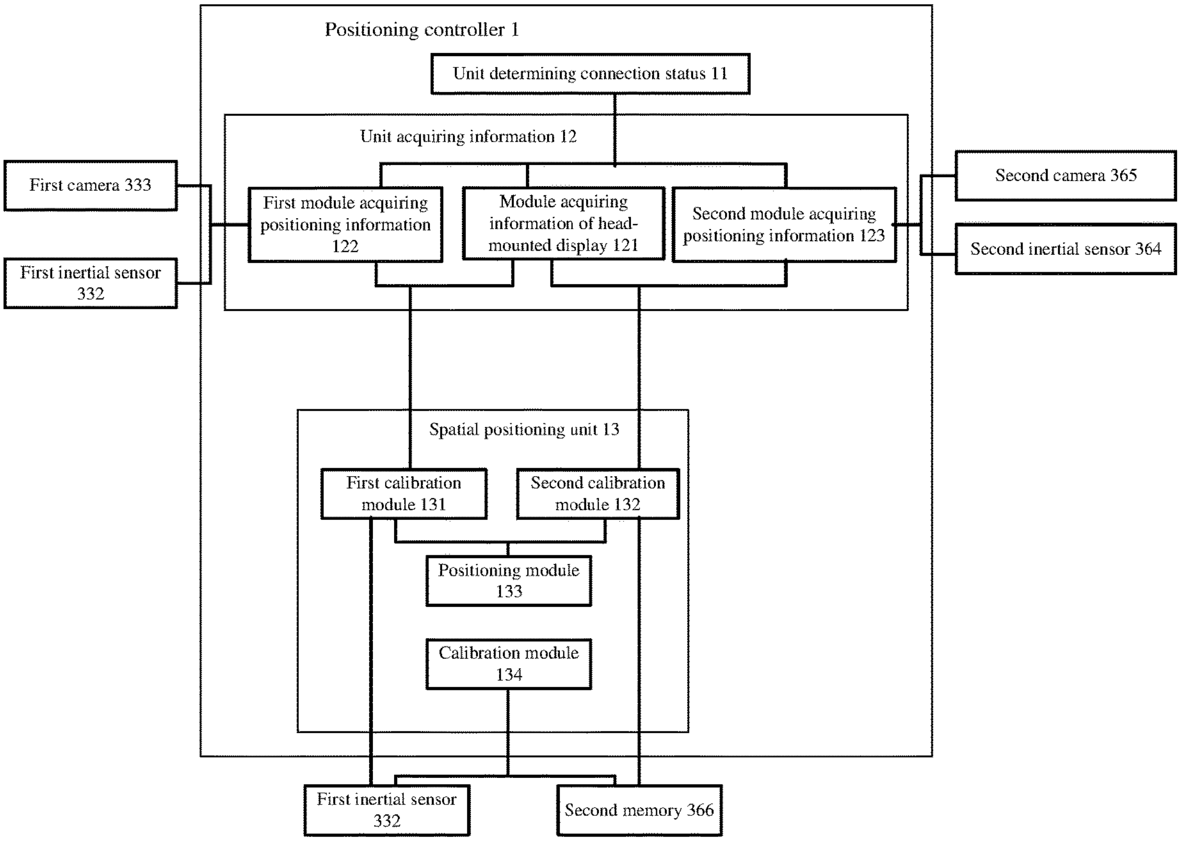
FIG. 14 shows the working principle diagram of the positioning controller of the combined controller provided by another embodiment of the present application.

In an embodiment of the present application, FIG. 14 is a working principle diagram of a positioning controller of a combined controller provided in an embodiment of the present application. As shown in FIG. 14, the information determining unit 12 specifically includes:

a module acquiring information of head-mounted display 121, configured to acquire positioning information of the head-mounted display device;

a first module acquiring positioning information 122, configured to acquire the first light-spot image of the first infrared sensor and the IMU data of the control handle, and compute the initial positioning information of the control handle according to the first light-spot image, the IMU data of the control handle and the positioning information of the head-mounted display device;

Specifically, the first module acquiring positioning information 122 is in communication connection with the module acquiring information of head-mounted display 121, the first calibration module 131, the first inertial sensor 332 and the first camera 333 respectively, and the first module acquiring positioning information 122 receives the IMU data of the control handle from the first inertial sensor 332 and receives the first light-spot image of the first infrared sensor 332 from the first camera 333, and computes the IMU data of the control handle, the first light-spot image and the positioning information of the head-mounted display device, and determines the initial positioning information of the control handle; after the first module acquiring positioning information 122 determines the initial positioning information of the control handle, it sends the initial positioning information of the control handle to the first calibration module 131.

a second module acquiring positioning information 123, configured to acquire the second light-spot image of the second infrared sensor 364 and the IMU data of the handle housing, and compute the handle housing according to the second light-spot image, the IMU data of the handle housing and the positioning information of the head-mounted display device initial location information.

Specifically, the second module acquiring positioning information 123 is in communication connection with the module acquiring information of head-mounted display 121, the second calibration module 132, the second inertial sensor 364 and the second camera 365 respectively. The second positioning information determination module 123 acquires the second inertial sensor 364 from the IMU data of the handle housing and the second light-spot image of the second infrared sensor 364 from the second camera 365; computes the IMU data of the handle housing, the first light-spot image and the positioning information of the head-mounted display device to obtain the initial positioning information of the handle housing. After the second module acquiring positioning information 123 determines the initial positioning information of the handle housing, it sends the initial positioning information of the handle housing to the second calibration module 132.

Figure 15:
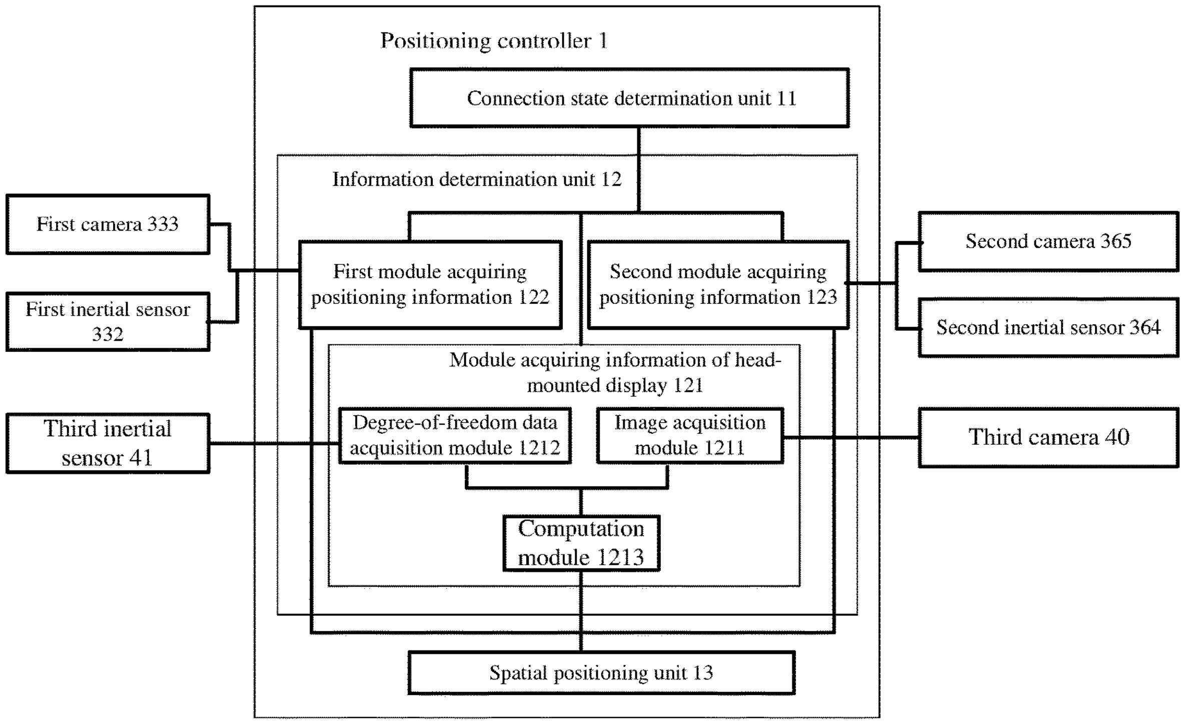
FIG. 15 shows the working principle diagram of the positioning controller of the combined controller provided by another embodiment of the present application.

In an embodiment of the present application, FIG. 15 shows a working principle diagram of a positioning controller of a combined controller provided in an embodiment of the present application. As shown in FIG. 15, the module acquiring information of head-mounted display 121 specifically includes:

an image acquisition module 1211, configured to acquire a spatial image of the head-mounted display device;

Specifically, when a third camera 40 is installed on the head-mounted display device, the third camera 40 can take a spatial image of the head-mounted display device. The image acquisition module 1211 communicates with the third camera 40 to acquire the spatial image of the head-mounted display device from by the third camera 40.

a degree-of-freedom data acquisition module 1212, configured to acquire the IMU data of the head-mounted display device.

Specifically, the IMU data of the head-mounted display device can be detected by the third inertial sensor 41 installed on the head-mounted display device. The degree-of-freedom data acquisition module 1212 is configured to receive the IMU data of the head-mounted display device from the third inertial sensor 41.

a computation module 1213, configured to compute the spatial image of the head-mounted display device and the IMU data of the head-mounted display device to obtain positioning information of the head-mounted display device.

The computation module 1213 is in communication connection with the image acquisition module 1211, the degree-of-freedom data acquisition module 1212, the first module acquiring positioning information 122 and the second module acquiring positioning information 123 respectively. The computation module 1213 receives the spatial image of the head-mounted display device from the image acquisition module 1211 and the IMU data of the head-mounted display device from the degree-of-freedom data acquisition module 1212, and compute the spatial image of the head-mounted display device and the IMU data of the head-mounted display device to determine the location information of the head-mounted display device, and transmit the location information of the head-mounted display device to the first module acquiring positioning information 122 and the second module acquiring positioning information 123.

Exemplary Virtual System

As the fourth aspect of the present application, the present application also provides a virtual system, and the virtual system includes: the above-mentioned combined controller; the positioning controller of the above-mentioned combined controller; a head-mounted display device; and a camera disposed on the head-mounted display device, the camera is configured to capture the first light-spot image of the first infrared sensor, the second light-spot image of the second infrared sensor and the image of the spatial space of the head-mounted display device; wherein the positioning controller of the combined controller is disposed on the head-mounted display device, the camera and the control handle are all communicated with the positioning controller of the combined controller.

Specifically, the imaging apparatus may include the above-mentioned first camera, second camera, and third camera, the first camera is configured to capture the first light-spot image of the first infrared sensor, and the second camera is configured to capture the image of the second infrared sensor. The third camera is configured to capture images of the spatial space of the head-mounted display device.

The working principle of the virtual system is described above in detail, and will not be described again.

Alternatively, the virtual system further includes: a third inertial sensor disposed on the head-mounted display device, and the third inertial sensor is configured to measure the IMU data of the head-mounted display device.

Alternatively, the virtual system includes: a virtual reality system or an augmented reality system.

Exemplary Electronic Device

Figure 16:
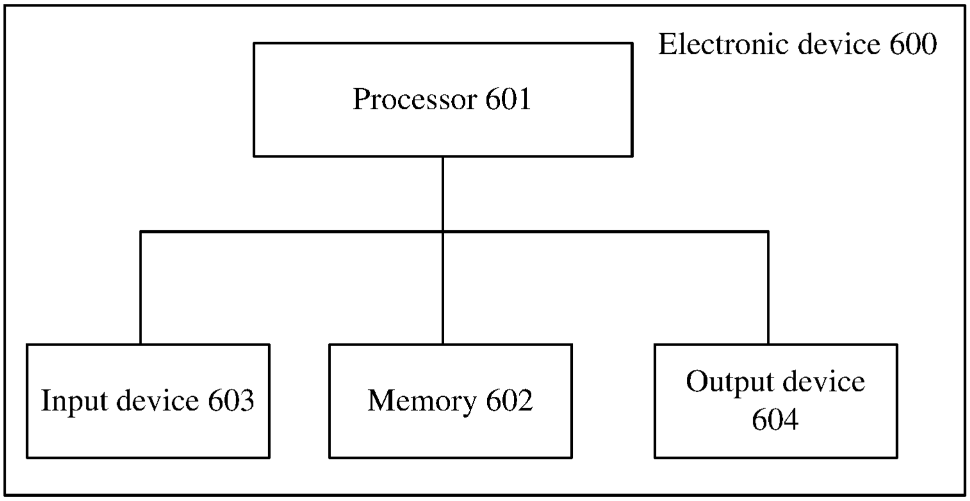
FIG. 16 is a schematic structural diagram of an electronic device provided by an embodiment of the present application.

Next, an electronic device according to an embodiment of the present application will be described with reference to FIG. 16. FIG. 16 is a schematic structural diagram of an electronic device provided by an embodiment of the present application.

As shown in FIG. 16, the electronic device 600 includes one or more processors 601 and a memory 602.

The processor 601 may be a central processing unit (CPU) or a processing unit in another form that has a data processing capability and/or information execution capability, and may control another component in the electronic device 600 to perform a desired function.

The memory 601 may include one or more computer program products. The computer program products may include various forms of computer readable storage media, for example, a volatile memory and/or non-volatile memory. The volatile memory may include, for example, a random access memory (RAM) and/or a high-speed buffer memory (cache). The nonvolatile memory may include, for example, a read-only memory (ROM), a hard disk, or a flash memory. One or more computer program information may be stored on the computer-readable storage medium, and the processor 601 may run the program information to implement the positioning method or other desired functions of the combined controller of the various embodiments of the present application described above.

In one example, the electronic device 600 may further include: an input device 603 and an output device 604, and these components are communicated via a bus system and/or other forms of connection mechanism (not shown).

The input apparatus 603 may include, for example, a keyboard, and a mouse.

The output apparatus 604 may output various information. The output apparatus 604 may include, for example, a display, a communication network, and a remote output device connected thereto.

Of course, for simplicity, only some components related to the present application in the electronic device 600 are shown in FIG. 16, and components such as bus, input/output interface, etc. are omitted. In addition, according to a specific application status, the electronic device 600 may further include any other proper component.

In addition to the methods and devices described above, an embodiment of the present application may also be computer program products that include computer program information that, when executed by a processor, causes the processor to perform the steps in the positioning method of the combined controller according to various embodiments of the present application described in this specification.

The computer program product can be written in any combination of one or more programming languages for executing the program codes for the operations of the embodiments of the present application, and the programming languages include object-oriented programming languages, such as Java, C, etc., also includes conventional procedural programming languages, such as the "C" language or similar programming languages. The program code may be fully executed on a user computing device, or some may be executed on user device as a standalone software package, or some may be executed on a user computing device while some may be executed on a remote computing device, or all the program code may be executed on a remote computing device or a server.

In addition, the embodiments of the present application may also be a computer-readable storage medium, on which computer program information is stored, and the computer program information, when executed by a processor, causes the processor to execute the steps in the positioning method of the combined controller according to various embodiments of the present application.

The computer-readable storage medium may use any combination of one or more readable media. The readable medium may be a readable signal medium or readable storage medium. The readable storage medium may include but is, for example, not limited to, an electronic, magnetic, optical, electromagnetic, infrared, or semiconductor system, apparatus, or means, or any combination thereof. More specific examples (a non-exhaustive list) of the readable storage medium include an electrical connection having one or more wires, a portable disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage means, a magnetic storage means, or any suitable combination thereof.

The basic principles of the present application have been described above in conjunction with specific embodiments, but it should be pointed out that the advantages, advantages, effects, etc. mentioned in the present application are only examples rather than limitations, and these advantages, advantages, effects, etc. Every embodiment of the application must have. In addition, the specific details disclosed above are only for the purpose of illustration and understanding, rather than limitation, and the above details do not limit the present application to be implemented by using the above specific details.

The block diagrams of devices, means, apparatuses, and systems involved in the present application are only illustrative examples and are not intended to require or imply that they must be communicated, arranged, and configured in the manner shown in the block diagrams. As those skilled in the art will recognize that, these means, apparatuses, devices, and systems can be communicated, arranged, and configured in any manner. Words such as "including", "comprising", and "having" are open words, which refer to "including but not limited to" and may be used interchangeably with it. The words "or" and "and" used herein refer to the word "and/or", and may be used interchangeably with it, unless the context clearly indicates otherwise. The word "such as" used herein refer to the phrase "such as but not limited to", and may be used interchangeably with it.

The above descriptions are only preferred embodiments of the present application, and are not intended to limit the present application. Any modifications, equivalent replacements, etc. made within the spirit and principles of the present application shall be included in the present application within the scope of protection created.

What is claimed is:

1. A positioning method of a combined controller, wherein the combined controller comprises a control handle and a handle housing, and the positioning method of the combined controller comprises the following steps executed by a processor:

acquiring initial positioning information of the control handle and initial positioning information of the handle housing after the control handle is in communication connection with a head-mounted display device;

acquiring a calibrated positioning of the control handle and a calibrated positioning of the handle housing; and calibrating the initial positioning information of the control handle and the initial positioning information of the handle housing according to the calibrated positioning of the control handle and the calibrated positioning of the handle housing to obtain spatial positioning information of the combined controller.

2. The positioning method of the combined controller according to claim 1, wherein the calibrating the initial positioning information of the control handle and the initial positioning information of the handle housing according to the calibrated positioning of the control handle and the calibrated positioning of the handle housing to obtain the spatial positioning information of the combined controller comprises:

calibrating the initial positioning information of the control handle according to the calibrated positioning of the control handle to obtain the positioning information of the control handle;

calibrating the initial positioning information of the handle housing according to the calibrated positioning of the handle housing to obtain the positioning information of the handle housing; and integrating the positioning information of the control handle and the positioning information of the handle housing to obtain spatial positioning information of the combined controller.

3. The positioning method of the combined controller according to claim 1, wherein the handle housing comprises an annular portion and a gripping portion, wherein a recessed portion is disposed at the center of the gripping portion to accommodate and fix the control handle; the combined controller further comprises a first infrared sensor disposed thereon and a second infrared sensor disposed on the annular portion; and the acquiring initial positioning of the control handle and initial positioning information of the handle housing after the control handle has been communicated with a head-mounted display device comprises:

acquiring positioning information of the head-mounted display device after the control handle being in communication with the head-mounted display device;

acquiring a first light-spot image of the first infrared sensor and IMU data of the control handle, and computing the initial positioning information of the control handle, according to the first light-spot image, the IMU data of the control handle and the positioning information of the head-mounted display device; and acquiring a second light-spot image of the second infrared sensor and IMU data of the handle housing, and computing the initial positioning information of the handle housing, according to the second light-spot image, the IMU data of the handle housing and the positioning information of the head-mounted display device.

4. The positioning method of the combined controller according to claim 3, wherein the acquiring the positioning information of the head-mounted display device comprises:

acquiring a spatial image of the head-mounted display device;

acquiring IMU data of the head-mounted display device; and computing the spatial image of the head-mounted display device and the IMU data of the head-mounted display device to obtain the positioning information of the head-mounted display device.

5. The positioning method of the combined controller according to claim 3, wherein before the acquiring initial positioning information of the control handle and initial positioning information of the handle housing after the control handle is in communication connection with the head-mounted display device, the positioning method of the combined controller further comprises the following step executed by the processor:

before the combined controller leaves the factory, performing calibration of the control handle and the handle housing of the combined controller to obtain the calibrated positioning of the control handle and the calibrated positioning of the handle housing.

6. The positioning method of the combined controller according to claim 5, wherein the performing calibration of the control handle and the handle housing of the combined controller to obtain the calibrated positioning of the control handle and the calibrated positioning of the handle housing comprises:

acquiring a first test light-spot image of the first infrared sensor and test IMU data of the control handle, a second test light-spot image of the second infrared sensor and test IMU data of the handle housing;

acquiring test positioning information of the control handle according to the first test light-spot image and the test IMU data of the control handle;

acquiring test positioning information of the handle housing according to the second test light-spot image and the test IMU data of the handle housing;

comparing the test positioning information of the control handle with standard positioning information of the control handle to obtain the calibrated positioning of the control handle; and comparing the test positioning information of the handle housing with standard positioning information of the handle housing to obtain the calibrated positioning of the handle housing.

7. The positioning method of the combined controller according to claim 5, wherein the combined controller further comprises a first memory provided on the control handle and a second memory provided on the handle housing;

after the performing pre-delivery calibration of the control handle and the handle housing of the combined controller to obtain the calibrated positioning of the control handle and the calibrated positioning of the handle housing, the positioning method of the combined controller further comprises:

storing the calibrated positioning of the control handle in the first memory and storing the calibrated positioning of the handle housing in the second memory respectively; and the acquiring a calibrated positioning of the control handle and a calibrated positioning of the handle housing comprises:

acquiring the calibrated positioning of the control handle from the first memory and acquiring the calibrated positioning of the handle housing from the second memory respectively.

8. The positioning method of the combined controller according to claim 1, wherein, the calibrated positioning of the control handle comprises a position offset of the control handle and a rotation offset of the control handle; and the calibrated positioning of the handle housing comprises a position offset of the handle housing and a rotation offset of the handle housing.

9. A positioning controller of a combined controller, comprising: a processor; and a memory coupled to the at least one processor, the memory storing instructions that, when executed by the at least one processor, cause the processor to perform operations comprising:

determining a connection status between a control handle and a head-mounted display device;

acquiring initial positioning information of the control handle and initial positioning information of a handle housing, and acquiring the calibrated positioning of the control handle and the calibrated positioning of the handle housing; and calibrating the initial positioning information of the control handle and the initial positioning information of the handle housing according to the calibrated positioning of the control handle and the calibrated positioning of the handle housing to obtain spatial positioning information of the combined controller.

10. The positioning controller of the combined controller according to claim 9, wherein the calibrating the initial positioning information of the control handle and the initial positioning information of the handle housing according to the calibrated positioning of the control handle and the calibrated positioning of the handle housing to obtain spatial positioning information of the combined controller spatial positioning unit comprises:

calibrating the initial positioning information of the control handle according to the calibrated positioning of the control handle to obtain positioning information of the control handle;

calibrating the initial positioning information of the handle housing according to the calibrated positioning of the handle housing to obtain positioning information of the handle housing; and integrating the positioning information of the control handle and the positioning information of the handle housing to obtain spatial positioning information of the combined controller.

11. The positioning controller of the combined controller according to claim 9, wherein the acquiring initial positioning of the control handle and initial positioning information of the handle housing after the control handle has been communicated with a head-mounted display device comprises comprises:

acquiring positioning information of the head-mounted display device after the control handle being in communication with the head-mounted display device;

acquiring a first light-spot image of a first infrared sensor and IMU data of the control handle, and compute the initial positioning information of the control handle according to the first light-spot image, the IMU data of the control handle and the positioning information of the head-mounted display device; and acquiring a second light-spot image of a second infrared sensor and IMU data of the handle housing, and compute the initial positioning information of the handle housing according to the second light-spot image, the IMU data of the handle housing and the positioning information of the head-mounted display device.

12. The positioning controller of the combined controllers according to claim 11, wherein the acquiring positioning information of the head-mounted display device comprises:

acquiring a spatial image of the head-mounted display device;

acquiring IMU data of the head-mounted display device; and computing the spatial image of the head-mounted display device and the IMU data of the head-mounted display device to obtain the positioning information of the head-mounted display device.

13. The positioning controller of the combined controller according to claim 10, wherein before the acquiring initial positioning information of the control handle and initial positioning information of the handle housing after the control handle is in communication connection with the head-mounted display device, the positioning controller further perform operations comprising:

performing calibration of the control handle and the handle housing of the combined controller before the combined controller leaves the factory, and obtain the calibrated positioning of the control handle and the calibrated positioning of the handle housing.

* * * * *